United States Patent
Kawamoto et al.

(10) Patent No.: US 6,857,499 B2
(45) Date of Patent: Feb. 22, 2005

(54) TRANSMISSION AND GEAR POSITION DETECTOR FOR ALL-TERRAIN VEHICLE

(75) Inventors: Yuichi Kawamoto, Akashi (JP); Kiyohito Takano, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 235 days.

(21) Appl. No.: 09/987,178

(22) Filed: Nov. 13, 2001

(65) Prior Publication Data

US 2002/0056586 A1 May 16, 2002

(30) Foreign Application Priority Data

Nov. 14, 2000 (JP) ........................................ 2000-346680
Jan. 23, 2001 (JP) ........................................ 2001-014571

(51) Int. Cl.⁷ .............................................. B60K 23/00
(52) U.S. Cl. ...................................................... 180/336
(58) Field of Search ................................ 180/315, 336

(56) References Cited

FOREIGN PATENT DOCUMENTS

| JP | 50-94369 | 12/1948 |
|---|---|---|
| JP | 62-124349 | 6/1987 |
| JP | 62-218232 | 9/1987 |
| JP | U 2-27061 | 2/1990 |
| JP | A 2-203079 | 8/1990 |
| JP | A 8-337131 | 12/1996 |
| JP | 11-190425 | 7/1999 |

Primary Examiner—Eric Culbreth
(74) Attorney, Agent, or Firm—Oliff & Berridge, PLC

(57) ABSTRACT

A transmission for an all-terrain vehicle includes: a variable-speed drive operatively connected to an engine, and a gear transmission mechanism operatively connected to the drive. The mechanism includes: a single shifting fork for selecting at least a forward high-speed ratio, a forward low-speed ratio, neutral or reverse, a shifting lever disposed at a position below a right end part or a left end part of a handlebar at a level above the engine, the shifting lever extending substantially upward, a single change lever shaft connected with the shifting fork, the change lever being disposed on the same side as the side on which the shifting lever is disposed with respect to a longitudinal center axis of the all-terrain vehicle, and the change lever shaft extending substantially upward at a rear end part of the engine, and a single connecting member connecting the change lever shaft and the shifting lever. The connecting member is extending at a side of the engine. The shifting lever and the shifting fork are connected by a simple connecting mechanism.

15 Claims, 17 Drawing Sheets

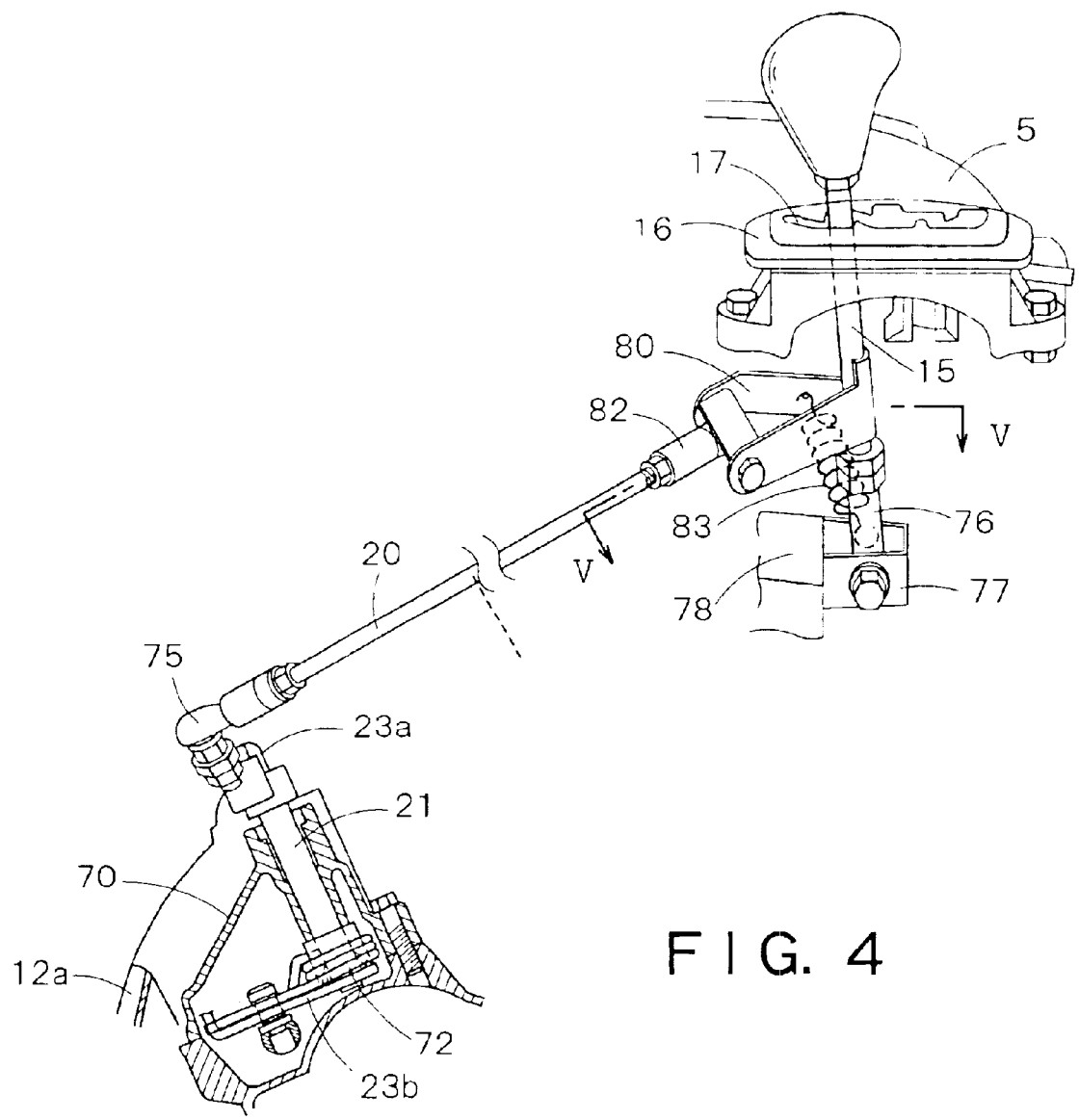
F I G. 4
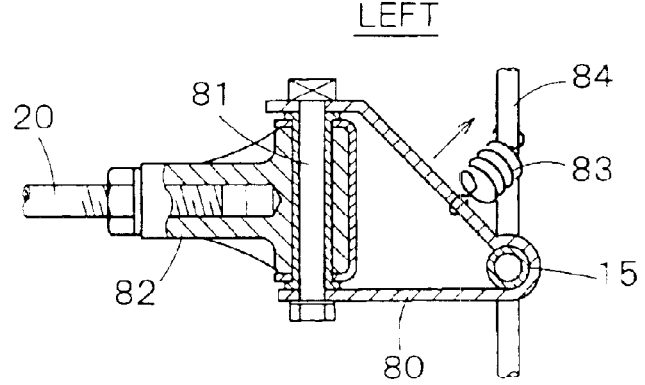
F I G. 5

TRANSMISSION AND GEAR POSITION DETECTOR FOR ALL-TERRAIN VEHICLE

BACKGROUND OF THE INVENTION

1. Field of the Invention

The present invention relates to a transmission for an all-terrain vehicle, including a variable-speed drive, such as a variable-speed belt-drive mechanism, and a gear transmission mechanism.

2. Description of the Related Art

In an all-terrain vehicle of above-mentioned type, a gear transmission mechanism combined with a variable-speed drive usually provides a forward high-speed ratio, a forward low-speed ratio, neutral and reverse. While the all-terrain vehicle is traveling, the gear transmission mechanism is usually placed in the forward high-speed ratio and the variable-speed drive changes speed automatically. When the condition of the road requires or when necessary, the vehicle is stopped temporarily, and the gear transmission mechanism is placed in the forward low-speed ratio or reverse.

Transmissions for an all-terrain vehicle, capable of being selectively placed in a forward high-speed ratio, a forward low-speed ratio, neutral or reverse by operating a single shifting lever are disclosed in JP-A Nos. Hei 8-337131 and Hei 2-203079, respectively.

FIGS. 17 and 18 show an all-terrain vehicle with the transmission disclosed in the former publication. As shown in FIG. 17, a single, L-shaped shifting lever 301 is supported on an engine 302. The shifting lever 301 extends laterally from the engine 302 to the right and rises upward. As shown in FIG. 18, the shifting lever 301 is connected with a first lever mechanism 305 for selecting a forward speed, neutral or reverse, and a second lever mechanism 306 for selecting a forward high-speed ratio or a forward low-speed ratio. The lever mechanisms 305 and 306 extend toward a middle part of the engine 302 with respect to width. Rods 307 and 308 or wires are connected to the lever mechanisms 305 and 306, respectively. Thus the single shifting lever 301 is connected to a shifting fork for selecting the forward speed, the neutral or the reverse, and a shifting fork for selecting the forward high-speed ratio or the forward low-speed ratio by the lever mechanism 305 and the rod 307, and the lever mechanism 306 and the rod 308, respectively. Gate plate 309 provided with H-shaped guide slots for guiding the shifting lever 301 is disposed on one side of a body.

FIG. 19 shows an all-terrain vehicle provided with the transmission disclosed in the latter publication. A single bent shifting lever 401 is disposed on one side of an engine 402 so as to project laterally outward. The shifting lever 401 is interlocked with a cam drum (change drum) 406, as a shifting fork driving member. The cam drum 406 is held in an upper part of the interior of a transmission case 405. The cam drum 406 is turned to operate two shifting forks.

Both the transmissions can be selectively placed in the forward high-speed ratio, the forward low-speed ratio, the neutral or the reverse by operating the single shifting lever. Since the shifting lever 301 of the former transmission shown in FIGS. 17 and 18 is supported on the engine 302 and projects to the right, the shifting lever 301 places a restriction on a space in which a rider's leg can be placed. Accordingly, riding quality of the vehicle is degraded. The shifting lever 301 needs to be moved horizontally and vertically along the H-shaped guide slots of the gate plate disposed on one side of the body and is not easy to operate.

Since the rods 307 and 308 connecting the shifting lever 301 to the shifting forks held in the transmission case are extended near the middle part of the engine 302 with respect to width, work for installing the rods 307 and 308, and adjusting the length of the rods 307 and 308 takes much time.

Since the two rods 307 an 308 are necessary for selecting the forward high-speed ratio or the forward low-speed ratio, and for selecting the forward speed, the neutral or the reverse, a wide space is needed to place the two rods 307 and 308. Therefore, the arrangement of various parts, for example an air cleaner, in a space around the middle part of the engine 302 is restricted.

The latter transmission mounted on the all-terrain vehicle shown in FIG. 19 has the transmission case 405 and the cam drum 406 held in the transmission case 405. Therefore a large space must be available in the transmission case 405 for holding the cam drum 406 therein and hence the transmission case 405 is inevitably large. Since the single cam drum 406 operates the two shifting forks, complicated mechanisms must be held in the transmission case 405 and hence the transmission is costly. The shifting lever 401 disposed at a lower position on one side of the body limits a space in which a driver's leg can be placed.

When the gear transmission mechanism of the all-terrain vehicle is placed in the reverse or the neutral, it is necessary to detect the gear position of the gear transmission mechanism and to indicate the gear position by a pilot lamp or the like for the rider.

Usually, the shifting mechanism of a conventional all-terrain vehicle includes a shifting rod, a change drum disposed near the shifting rod. The change drum is turned to move a shifting sleeve by a shifting arm interlocked with the shifting rod by the cam groove or the like of the change drum to place the transmission in a desired gear ratio. A gear position detector for detecting the reverse position and the neutral position is mounted on the change drum and detect the reverse position and the neutral position corresponding to the angular positions of the change drum, respectively.

Another conventional shifting mechanism disclosed in JP-U No. Hei 2-27061, which is different from the foregoing shifting mechanism having a change drum, is not provided with any change drum. A gear position detecting device included in this shifting mechanism includes a shifting rod provided with depressions, a detecting pin extended in the direction of the diameter of the shifting rod so as to be in contact with the depression of the shifting rod, and a gear-position detecting switch. The gear-position detecting switch detects the gear positions of the transmission from the axial position of the detecting pin.

The former shifting mechanism having a change drum needs a large space for holding the change drum therein, and the detecting switches for detecting the neutral and the reverse position must be mounted on the change drum. Consequently, the shifting mechanism is unavoidably large.

The gear-position detecting switch of the latter shifting mechanism is disposed at a position corresponding to a middle part of the length of the shifting rod. Since various parts are arranged around the gear-position detecting switch, work for installing the gear-position detecting switch takes much time. Work for accurately forming the depressions in the surface of the shifting rod needs much time.

SUMMARY OF THE INVENTION

Therefore, it is an object of the present invention to provide a simple transmitting mechanism for transmitting a shifting motion of a shifting lever to a shifting fork in a transmission for an all-terrain vehicle. Another object of the present invention is to provide a transmission having improved operability for an all-terrain vehicle.

It is an object of the present invention to provide a gear position detector capable of detecting a neutral position and a reverse position without changing the basic shape of a shifting rod used in a conventional transmission and capable of being easily installed, and to provide a transmission for an all-terrain vehicle with such gear position detecting device.

According to a first aspect of the present invention, a transmission for an all-terrain vehicle with an engine comprises: a variable-speed drive operatively connected to the engine, and a gear transmission mechanism operatively connected to the variable-speed drive. The gear transmission mechanism includes: a single shifting fork for selecting at least a forward high-speed ratio, a forward low-speed ratio, neutral or reverse, a shifting lever disposed at a position below a right end part or a left end part of a handlebar at a level above the engine, the shifting lever extending substantially upward, a single change lever shaft connected with the shifting fork, the change lever being disposed on the same side as the side on which the shifting lever is disposed with respect to a longitudinal center axis of the all-terrain vehicle, and the change lever shaft extending substantially upward at a rear end part of the engine, and a single connecting member connecting the change lever shaft and the shifting lever, the connecting member extending at a side of the engine.

Preferably, the gear transmission mechanism further comprises a torsion coil spring wound around the change lever shaft so as to connect the change lever shaft and the shifting fork via the torsion coil spring.

Preferably, the gear transmission mechanism further comprises a gate member provided with a longitudinal guide slot for guiding the shifting lever, the guide slot being provided in the same side edge of right or left with retaining parts for retaining the shifting lever at positions corresponding to the forward low-speed ratio, the forward high-speed ratio, neutral and reverse.

Preferably, an intermediate stopper for temporarily holding the shifting lever in a neutral state is formed in a section of the guide slot between the retaining part for the forward high-speed ratio and the retaining part for the forward low-speed ratio.

Preferably, the shifting lever is supported in a spherical bearing mechanism such that the shifting lever can be tilted forward, rearward, rightward and leftward, the shifting lever being biased by a spring toward the side edge of the guide slot in which the retaining parts are provided.

Preferably, the connecting member connecting the change lever shaft and the shifting lever is a substantially straight connecting rod.

The transmission in the first aspect of the present invention has the following effects.

(1) The gear transmission mechanism can be selectively placed in at least the forward high-speed ratio, the forward low-speed ratio, neutral and reverse by operating the single shifting fork. Since the shifting lever is disposed at a position below a right end part or a left end part of the handlebar at a level above the engine and is set in a substantially vertical position, the change lever shaft connected with the shifting fork is disposed on the same side as the shifting lever with respect to the longitudinal center axis of the all-terrain vehicle and is extending substantially upward at a position corresponding to the rear end of the engine, and the change lever shaft and the shifting lever are connected by the single connecting member extending on one side of the engine, the operation of the shifting lever can be transmitted to the shifting fork by a simple, compact connecting mechanism. Therefore, a large space can be provided for a rider's leg, and a satisfactory riding quality is ensured. The number of parts including a change drum and connecting members can be reduced and the weight can be reduced.

(2) Preferably, a torsion coil spring is wound around the change lever shaft and connects the change lever shaft to the shifting fork. Thus, shocks produced by the repelling actions between dogs that occurs during a shifting operation can be absorbed by the torsion coil spring, the shocks transmitted to the shifting lever are reduced and hence operability is improved.

(3) Preferably, the shifting lever is guide by the gate member provided with a longitudinal guide slot for guiding the shifting lever, and the guide slot is provided on its right or left side with the retaining parts for retaining the shifting lever at positions corresponding to the forward low-speed ratio, the forward high-speed ratio, neutral and reverse. Accordingly, the gate member needs a small space.

(4) Preferably, the intermediate stopper for temporarily holding the shifting lever in a neutral state is formed in a section of the guide slot between the retaining part for the forward high-speed ratio and that for the forward low-speed ratio. Thus, the shifting lever is held temporarily in a neutral state when the same is moved from the position for the forward high-speed ratio to that for the forward low-speed ratio so that the shifting operation of the transmission mechanism from the high speed ratio to the low speed ratio is performed smoothly.

(5) Preferably, the shifting lever is supported in the spherical bearing mechanism such that the shifting lever can be tilted forward, rearward, rightward and leftward, and is biased toward the side provided with the retaining parts of the guide slot by the spring. Accordingly, the shifting lever can be supported by a compact supporting mechanism and can be retained at the positions corresponding to the gear positions by a simple mechanism.

(6) Preferably, the connecting member connecting the change lever shaft and the shifting lever is the substantially straight connecting rod, which further simplifies the shifting motion transmitting mechanism.

According to a second aspect of the present invention, a gear position detector for an all-terrain vehicle with a gear transmission mechanism disposed in a transmission case, the gear transmission mechanism including a shifting rod and a shifting sleeve and being capable of changing gear position by moving the shifting sleeve by an axial movement of the shifting rod, comprises: a gear-position detecting switch mounted to the transmission case at a position near one axial end of the shifting rod, the gear-position detecting switch being configured to detect a neutral position when the axial end of the shifting rod axially moves to a neutral position and engages the gear-position detecting switch or a reverse position when the axial end of the shifting rod axially moves to a reverse position and engages the gear-position detecting switch.

Preferably, the gear transmission mechanism can be selectively placed in one of two forward speeds, neutral and reverse by operating a single shifting rod, and the gear-position detecting switch is disposed so as to detect the neutral and reverse positions with respect to the single shifting rod.

Preferably, the gear-position detecting switch includes a neutral-position detecting switch and a reverse-position detecting switch which are independently mounted from each other.

Preferably, the reverse-position detecting switch is disposed opposite to one axial end of the shifting rod, and the neutral-position detecting switch is disposed near the same axial end of the shifting rod at a position radially outside the shifting rod.

The gear position detector in the second aspect of the present invention has the following effects.

(1) The gear-position detecting switch is mounted to the transmission case at a position near one axial end of the shifting rod, and the gear-position detecting switch detects the neutral position and the reverse position when the axial end of the axially moved shifting rod engages the gear-position detecting switch. Therefore, the gear-position detecting switch can be easily mounted to the transmission case, the axial end of the shifting rod serves as a switch operating part, and hence the shifting rod can be used for operating the gear-position detecting switch without changing the basic shape of a shifting rod used in a conventional transmission.

(2) Preferably, the gear transmission mechanism can be selectively set in one of the two forward gear positions, the neutral position and the reverse position by the single shifting rod, and the gear-position detecting switch is disposed to the single shifting rod so as to detect the neutral and the reverse position. Accordingly, the neutral-position detecting switch and the reverse-position detecting switch can be disposed in a narrow space.

(3) Preferably, the gear-position detecting switch includes the neutral-position detecting switch and the reverse-position detecting switch which are independently mounted from each other. Accordingly, the neutral-position detecting switch and the reverse-position detecting switch can be properly disposed relative to the axial end of the shifting rod as located at positions corresponding to neutral and reverse.

(4) Preferably, the reverse-position detecting switch is disposed opposite to one axial end of the shifting rod, and the neutral-position detecting switch is disposed near the same axial end of the shifting rod at a position radially outside of the shifting rod. Accordingly, a space radially outside the shifting rod and a space axially outside the shifting rod can be used effectively for disposing the gear-position detecting switch.

According to a third aspect of the present invention, a transmission for an all-terrain vehicle comprises: a transmission case, a gear transmission mechanism disposed in the transmission case, the gear transmission mechanism including an axially movable shifting rod and a shifting sleeve to be operated by axially moving the shifting rod to change gear ratio, and a gear-position detecting switch attached to the transmission case at a position near one axial end of the shifting rod, the gear-position detecting switch being configured to detect a neutral position when the axial end of the shifting rod axially moves to a neutral position and engages the gear-position detecting switch or a reverse position when the axial end of the shifting rod axially moves to a reverse position and engages the gear-position detecting switch.

Preferably, the gear transmission mechanism can be selectively placed in one of two forward speeds, neutral and reverse by a single shifting rod, and the gear-position detecting switch is disposed so as to detect the neutral and reverse positions with respect to the single shifting rod.

Preferably, the gear-position detecting switch includes a neutral-position detecting switch and a reverse-position detecting switch which are independently mounted from each other.

Preferably, the reverse-position detecting switch is disposed opposite to one axial end of the shifting rod, and the neutral-position detecting switch is disposed near the same axial end of the shifting rod at a position radially outside of the shifting rod.

The third aspect of the present invention can provide the same advantageous effects as those of the second aspect of the present invention.

BRIEF DESCRIPTION OF THE DRAWINGS

FIG. 4 is a side elevation of a shifting motion transmitting mechanism for transmitting a shifting motion of a shifting lever to a change lever shaft;

FIG. 5 is a sectional view taken on line V—V in FIG. 4;

DESCRIPTION OF THE PREFERRED EMBODIMENTS

Figure 1:
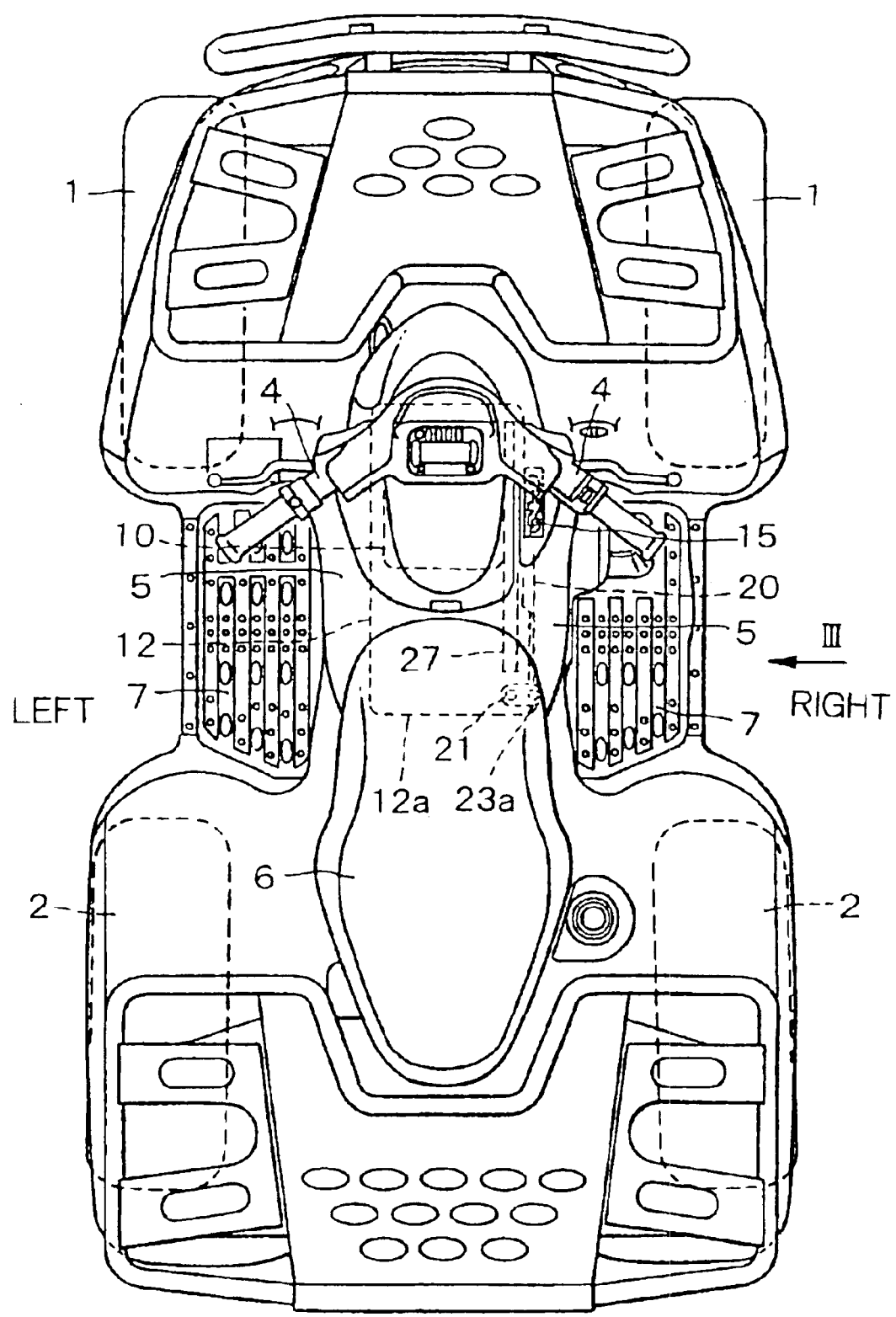
FIG. 1 is a plan view of an all-terrain vehicle to which the present invention is applied.

FIG. 1 shows an all-terrain vehicle with a transmission in a first embodiment according to the present invention in a plan view. The all-terrain vehicle has a pair of front wheels 1, a pair of rear wheels 2, a handlebar 4 disposed above a position between front wheels 1 and the rear wheels 2, a cover 5 disposed behind the handlebar 4, a seat 6 disposed behind the cover 5, and steps 7 disposed below spaces on the right and the left side of the cover 5 and the seat 6. An air cleaner 10 is disposed under the cover 5, and an engine 12 is disposed in a space under the air cleaner 10 and a front end part of the seat 6.

In the following description, words "right" and "left" are used for indicating positions, directions and such with respect to the direction of forward travel of the all-terrain vehicle as indicated in the drawings to facilitate understanding the description. A shifting lever 15, which is operated to select a forward high-speed ratio, a forward low-speed ratio, neutral or reverse, is disposed inside a right wall of the cover 5 and below a right part of the handlebar 4. A single change lever shaft 21 extends upward from a right-hand rear end part of the crankcase 12a of the engine 12. A single, straight connecting rod 20 connects the shifting lever 15 to an outer change lever 23a which is connected to the upper end of the change lever shaft 21. The connecting rod 20 extends along the right side surface of the engine 12.

Figure 2:
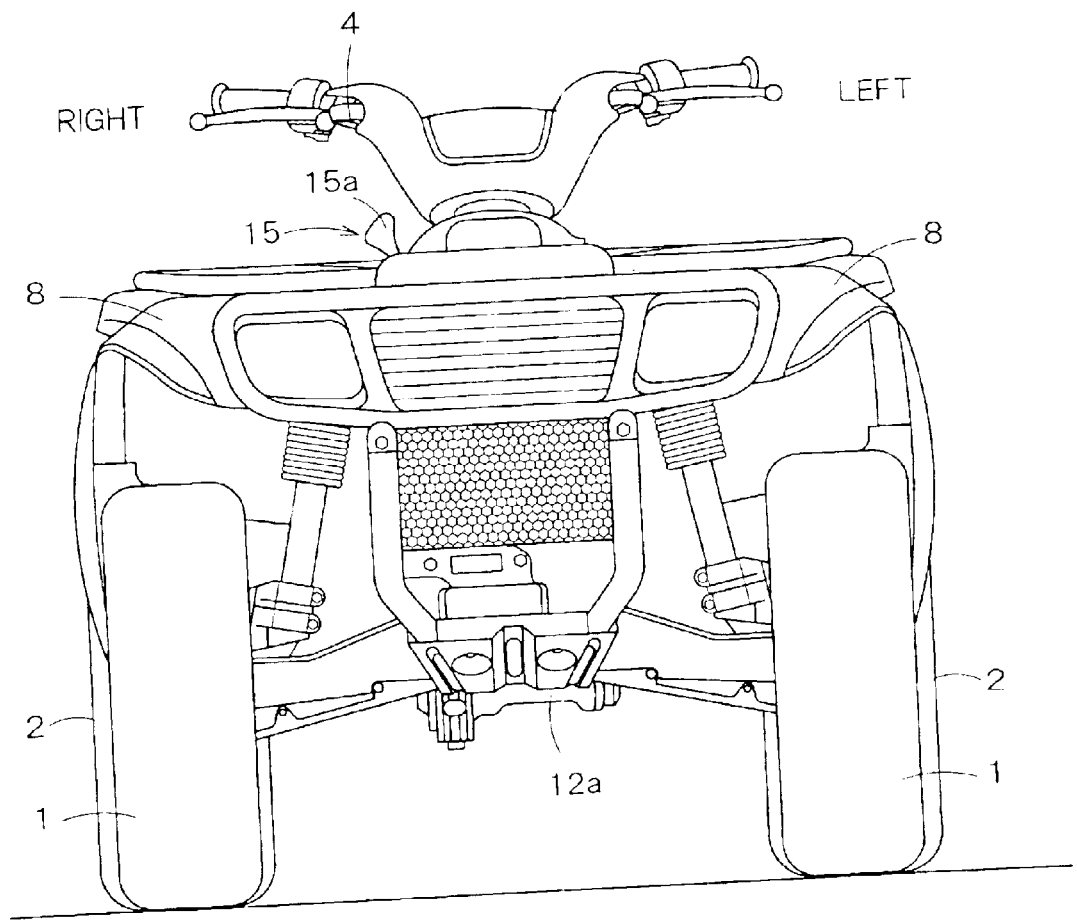
FIG. 2 is a front elevation of the all-terrain vehicle shown in FIG. 1.

FIG. 2 is a front elevation of the all-terrain vehicle. The front wheels 1 are covered with fenders 8, respectively.

Figure 3:
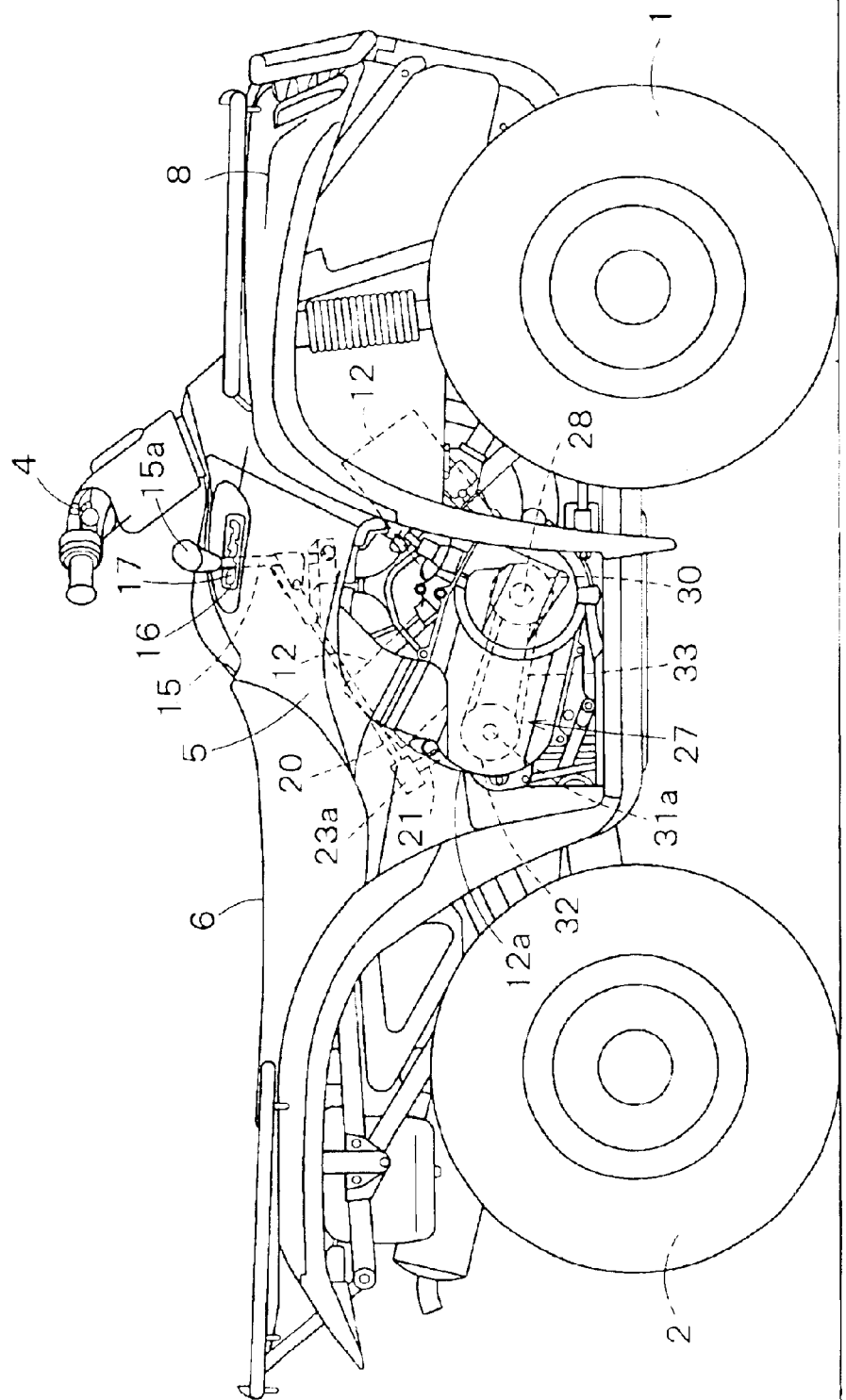
FIG. 3 is a side elevation of the all-terrain vehicle taken in the direction of the arrow III in FIG. 1.

FIG. 3 is a side elevation of the all-terrain vehicle taken in the direction of the arrow III in FIG. 1. The engine 12 is a two-cylinder V-engine. A variable-speed V-belt drive 27 is joined to the right side wall of the crankcase 12a (FIG. 1). The variable-speed V-belt drive 27 includes a drive pulley 30 mounted on the output shaft 28 of the engine 12, a driven pulley mounted on a driven shaft 31a supported on a rear end part of the crankcase 12a, and a V-belt extended between the pulleys 30 and 32. As generally known, the effective diameters of the pulleys 30 and 32 are varied automatically according to the variation of torque for automatic nonstage transmission.

A lower end part of the shifting lever 15 is located above the engine 12. The shifting lever 15 extends linearly upward through a guide slot 17 formed in a gate plate 16 attached to an upper part of the right side wall of the cover 5. A grip 15a attached to the upper end of the shifting lever 15 is placed in a space between the handlebar 4 and the upper surface of the cover 5. The connecting rod 20 extends obliquely rearward from the shifting lever 15 along the right side surface of the engine 12 to the outer change lever 23a.

Figure 6:
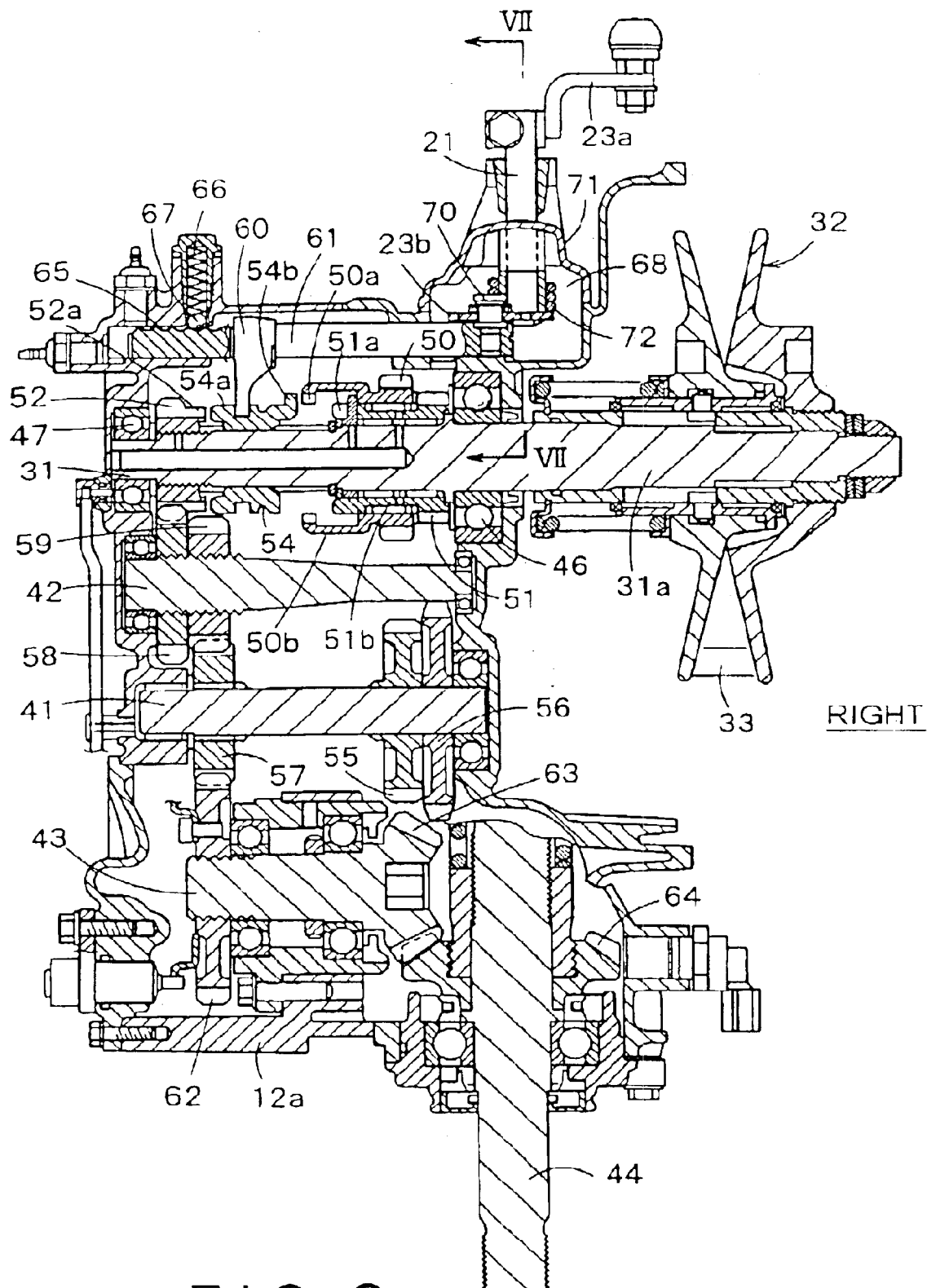
FIG. 6 is a sectional development of a gear transmission mechanism on a plane including the center axes of shafts.

FIG. 6 is a sectional development of the gear transmission mechanism formed in the crankcase 12a taken on a plane including the axes of shafts. An input shaft 31 formed integrally with the driven shaft 31a supporting the driven pulley 32, a first intermediate shaft 41, a second intermediate shaft 42 and an output shaft 43 are arranged in parallel to each other in the crankcase 12a. A propeller shaft 44 is supported on the crankcase 12a so as to extend perpendicularly to the output shaft 43 in a horizontal plane. A forward high-speed gear 50 and a forward low-speed gear 51 are mounted side by side on a part near a right bearing 46 of the input shaft 31. A reverse gear 52 is mounted on a part near a left bearing 47 of the input shaft 31. A single shifting sleeve 54 is splined for axial sliding to a middle part of the input shaft 31.

The reverse gear 52 is provided on its right end surface with dogs 52a and is supported for rotation by a needle bearing on the input shaft 31. The forward low-speed gear 51 has a boss 51b axially extending from its left end surface through the bore of the forward high-speed gear 50 and provided on its extremity with dogs 51a. The forward low-speed gear 51 is supported for rotation by a needle bearing on the input shaft 31. The forward high-speed gear 50 has arms 50b extending to the left and provided with a dog 50a projecting from its inner surface. The forward high-speed gear 50 is supported for rotation by a needle bearing on the boss 51b of the forward low-speed gear 51. The shifting sleeve 54 is provided on its left end surface with reverse dogs 54a capable of engaging with the dogs 52a of the reverse gear 52, and on its right end surface with L-shaped forward dogs 54b capable of selectively engaging with the dogs 50a of the forward high-speed gear 50 or the dogs 51a of the forward low-speed gear 51.

The axial distance between the dogs 50a for forward high speed and the dogs 51a for forward low speed is determined such that the forward dogs 54b of the shifting sleeve 54 can be temporarily set in a neutral state between the dogs 50a and 51a.

The shifting sleeve 54 is provided in its circumference with a circular groove, and a single shifting fork 60 engages in the circular groove. The shifting fork 60 is fixed to a shifting rod 61 supported for axial movement on the crankcase 12a. The shifting fork 60 moves laterally together with the shifting rod 61. In FIG. 6, the shifting fork 60 is set at a neutral position. The reverse dogs 54a of the shifting sleeve 54 and the dogs 52a of the reverse gear 52 are engaged when the shifting fork 60 is moved to the left from the neutral position. The forward dogs 54b of the shifting sleeve 54 and the dogs 50a of the forward high-speed gear 50 are engaged when the shifting fork 60 is moved to the right from the neutral position. The forward dogs 54b of the shifting sleeve 54 are moved through a neutral position between the forward dogs 50a and 50b and the forward dogs 54b of the shifting sleeve 54 and the dogs 51a of the forward low-speed gear 51 are engaged when the shifting fork 60 is moved further to the right. Thus, the gear transmission mechanism can be placed selectively in one of the four speeds, i.e., the forward high-speed ratio, the forward low-speed ratio, neutral and reverse.

Forward intermediate gears 55 and 56 are fixedly mounted on a right end part of the first intermediate shaft 41 and are engaged with the forward high-speed gear 50 and the forward low-speed gear 51, respectively. (See also the forward high-speed gear 167 and the forward low-speed gear 168 of FIG. 15 as a comparison for the location of the forward high-speed gear 50 and the forward low-speed gear 51.) A first intermediate gear 57 is fixedly mounted on the left end part of the first intermediate shaft 41. A reverse intermediate gear 58 engaged with the reverse gear 52, and a second intermediate gear 59 engaged with the first intermediate gear 57 are fixedly mounted on the second intermediate shaft 42. The first intermediate gear 57 is engaged with a gear 62 mounted on the output shaft 43. The output shaft 43 and the propeller shaft 44 are interlocked by bevel gears 63 and 64.

The propeller shaft 44 extends longitudinally in a horizontal plane. The propeller shaft 44 has a rear end part connected through a final reduction gear to rear axles, and a front end part connected through a suitable universal joint or a clutch to a front propeller shaft.

Four notches 65 are formed at predetermined axial intervals in a left end part of the shifting rod 61. The notches 65 correspond to positions of the shifting rod 61 for the forward high-speed ratio, the forward low-speed ratio, neutral and reverse, respectively. A ball 67 is biased by a spring 66 so as to engage in one of the notches 65. The notches 65 for the positions for reverse, neutral, the forward high-speed ratio and the forward low-speed ratio, respectively, are arranged in that order from right to left. A right end part of the shifting rod 61 projects into a change lever chamber 68 formed in a rear, right, upper part of the crankcase 12a. A shifting pin 70, which is extending upward, is attached to the right end part of the shifting rod 61. The change lever shaft 21 is supported for turning in an upright position on a top cover 71 of the change lever chamber 68. An upper end part of the change lever shaft 21 projects upward from the top cover 71. The L-shaped outer change lever 23a is fixed to the upper end part of the change lever shaft 21.

Figure 7:
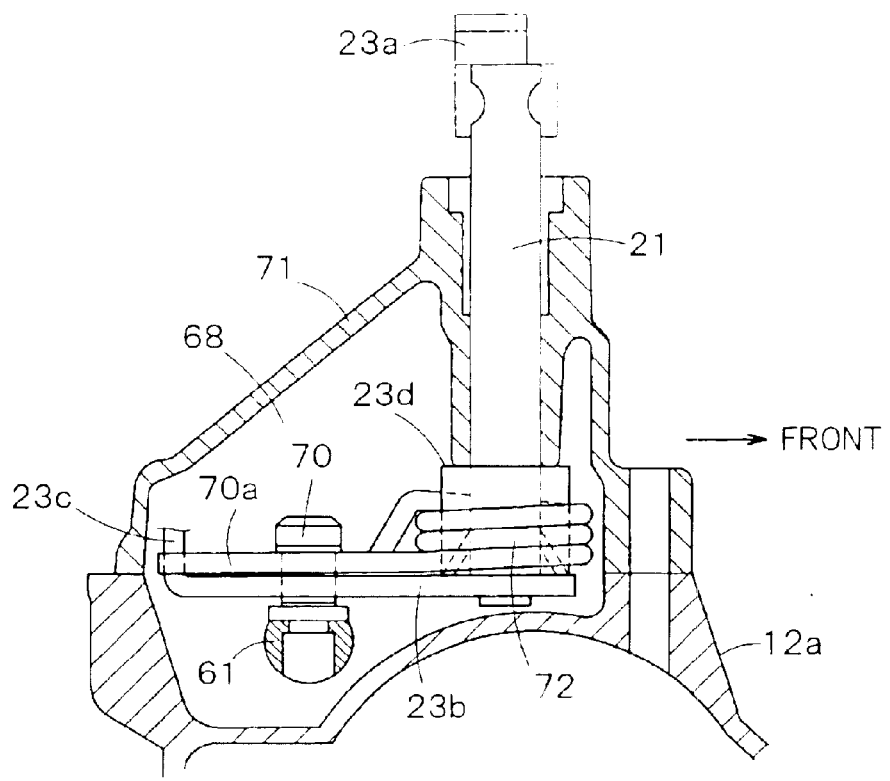
FIG. 7 is an enlarged sectional view taken on line VII—VII in FIG. 6.

Referring to FIG. 7 showing the change lever chamber 68 in a longitudinal sectional view, a boss 23d formed integrally with an inner change lever 23b is fixed to a lower end part of the change lever shaft 21. A torsion coil spring 72 is wound on the boss 23d. Straight end parts 70a of the torsion coil spring 72 extend linearly toward the shifting pin 70 and are engaged with the side edges of an up-bent front end part 23c of the inner change lever 23b, so that the end parts 70a turn together with the inner change lever 23b.

Figure 8:
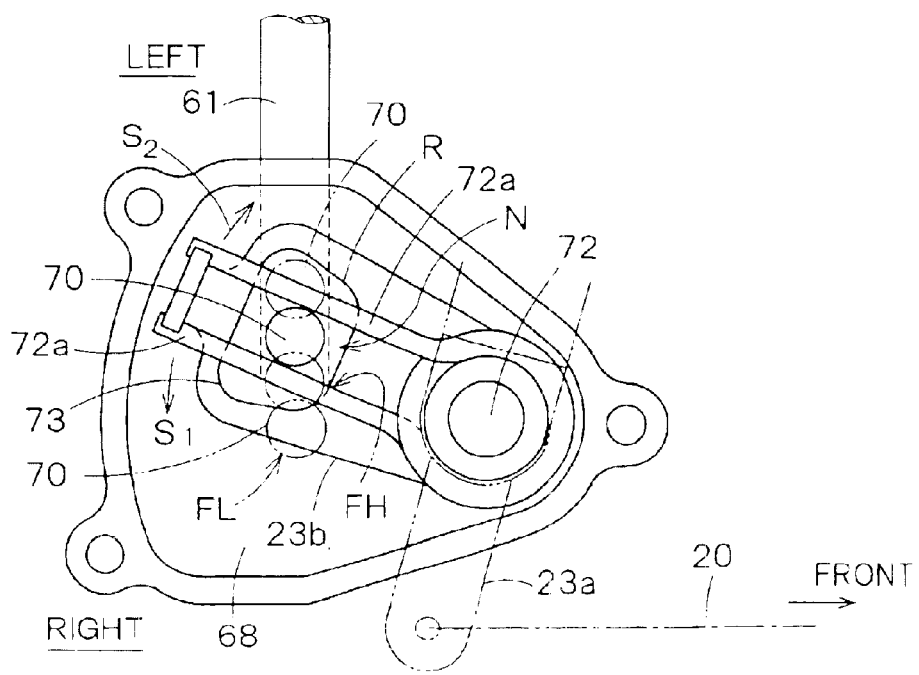
FIG. 8 is a plan view of a change lever chamber, in which an upper wall is removed.

Referring to FIG. 8 showing the change lever chamber 68 in a plan view, in which the top cover 71 is removed, the inner change lever 23b is provided with an opening 73 far greater than the shifting pin 70. The shifting pin 70 is held elastically between the straight end parts 72a of the torsion coil spring 72. The shifting pin 70 is moved laterally by the straight end parts 72a when the torsion coil spring 72 is turned. The shifting pin 70 can be selectively placed at one of a forward low-speed position FL, a forward high-speed position FH, a neutral position N and a reverse position R.

Referring to FIG. 4 showing a shifting motion transmitting mechanism for transmitting a shifting motion of the shifting lever 15 to the change lever shaft 21, the outer change lever 23a is provided with a spherical joint 75. A rear end part of the connecting rod 20 is connected to the spherical joint 75. The shifting lever 15 has a lower end part supported for turning by a spherical support device (pillow ball joint) 76 on a U-shaped bracket 77 opening rearward and fastened to a right frame 78 of the body of the all-terrain vehicle. A V-shaped bracket 80 is welded to a middle part of the shifting lever 15 so as to open rearward. As shown in FIG. 5, a joint 82 is supported by a pin 81 on the bracket 80 so as to be turnable in a vertical plane. A front end part of the connecting rod 20 is connected to the joint 80. The working length of the connecting rod 20 is adjustable. A coil spring 83 for biasing the shifting lever 15 to the left has one end connected to a left part of the bracket 80 and the other end connected to a body frame 84.

Figure 9:
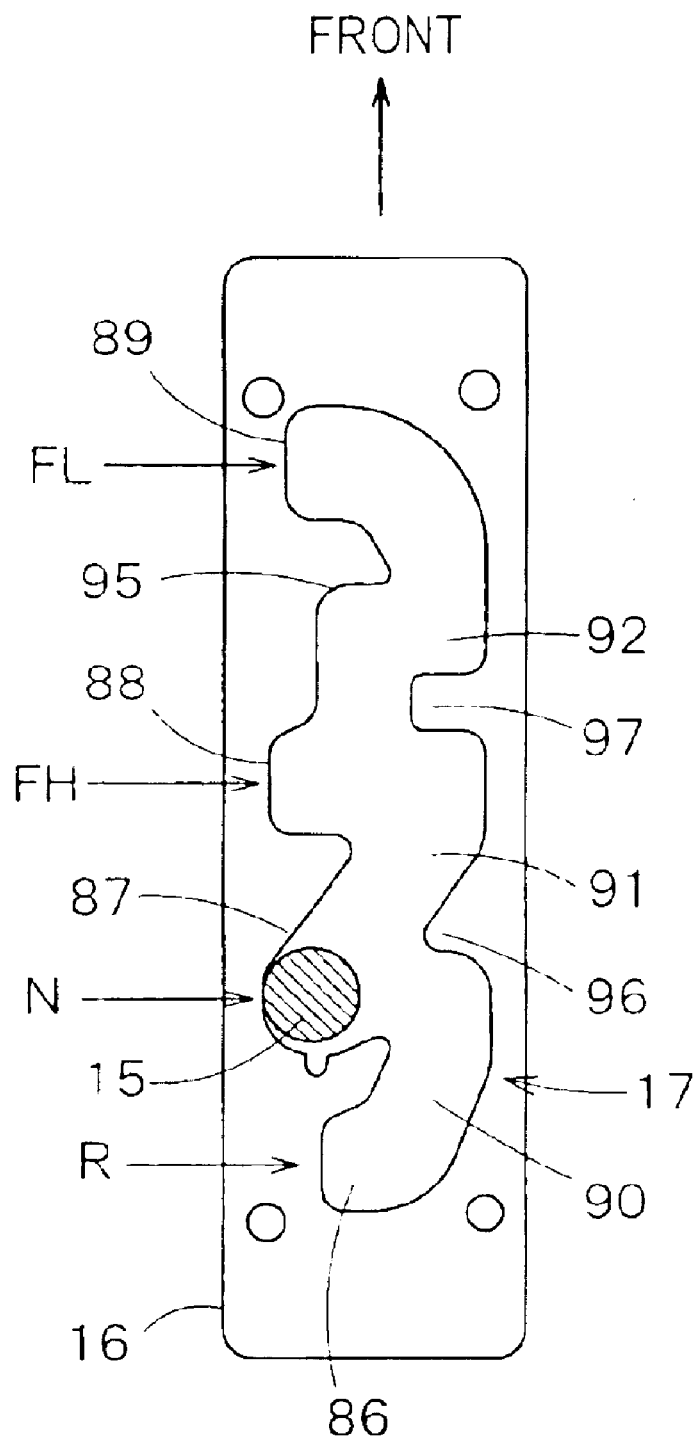
FIG. 9 is an enlarged plan view of a gate plate.

Referring to FIG. 9 showing the gate plate 16 provided with the guide slot 17 in a plan view, the guide slot 17 has a longitudinal passage part, and a reverse position recess 86, a neutral position recess 87, a forward high-speed position recess 88 and a forward low-speed position recess 89 arranged in that order from the rear end toward the front end of the passage part. All the recesses 86, 87, 88 and 89 are formed in the left side edge of the passage part. Whereas the conventional gate plate is provided with an H-shaped guide slot, the guide slot 17 is substantially straight. A section 90 between the reverse position recess 86 and the neutral position recess 87, and a section 91 between the neutral position recess 87 and the forward high-speed position recess 88 are inclined obliquely forward to the right. An intermediate stopping edge 95 is formed in a side edge of the section 92 between the forward high-speed position recess 88 and the forward low-speed position recess 89 to stop the shifting lever 15 temporarily in a neutral state. The section 92 bends to the right along the intermediate stopping edge 95 and extends obliquely forward to the left to the forward low-speed position recess 89. When the shifting lever 15 rests on the intermediate stopping edge 95, the forward dogs 54b of the shifting sleeve 54 (FIG. 6) are at a position between the forward high-speed dogs 50a and the forward low-speed dogs 51a.

[Operations and Functions]

Since the shifting lever 15 is set in a substantially upright position in a space under the right part of the handlebar 4 at the level above the engine 12 as shown in FIG. 3, the shifting lever 15 does not interfere with the rider's leg when the shifting lever 15 is operated for shifting, and a sufficient space is provided for the rider's leg. Therefore, the rider is able to operate the shifting lever 15 substantially without changing a riding position. The position of the shifting lever 15 in the guide slot 17 can be easily recognized.

The shifting lever 15 is operated for shifting while the all-terrain vehicle is stopped. Basically, the variable-speed V-belt drive 27 is a neutral state when the shifting lever 15 is set at the neutral position and the engine 12 is idling. Since the dogs 54a and 54b of the shifting sleeve 54 shown in FIG. 6 are not engaged with any of the respective dogs 50a, 51a and 52a of the gears 50, 51 and 52, a low torque is applied to the input shaft 31 by the driven pulley 32 frictionally rotated by the belt 33 and the input shaft is slowly rotating.

[Shifting from Neutral State to Forward High-speed State]

Referring to FIG. 9, when the shifting lever 15 placed at the neutral position N is pushed forward, the shifting lever 15 is guided obliquely forward to the right by the inclined section 91. The shifting lever 15 is stopped by a protrusion 97 defining the front end of the inclined section 91, so that it is known that the shifting lever 15 has arrived at a position corresponding to the forward high-speed position recess 88. Then, the shifting lever 15 is moved to the left into the forward high-speed position recess 88. The shifting lever 15 is held in the forward high-speed position recess 88 by the resilience of the coil spring 83 (FIG. 4).

When the shifting lever 15 is thus shifted from the neutral position to the forward high-speed position, the connecting rod 20 pulls the outer change lever 23a forward, the change lever shaft 21 and the inner change lever 23b are turned together. Consequently, the inner change lever 23b is turned counterclockwise, i.e., in the direction of the arrow $S_1$ (FIG. 8) from a neutral position N shown in FIG. 8.

At the same time, the torsion coil spring 72 is turned in the direction of the arrow $S_1$ together with the inner change lever 23b and urges the shifting pin 70 toward the forward high-speed position FH. Consequently, the shifting rod 61, the shifting fork 60 and the shifting sleeve 54 shown in FIG. 6 are moved to the right and the forward dogs 54b of the shifting sleeve 54 are engaged with the forward high-speed dogs 50a. Since the input shaft 31 is driven for rotation by a low torque, the dogs 54b and 50a are synchronized quickly and are able to engage.

Sometimes, the dogs 54b and 50a repel each other during the shifting operation. Shocks produced by the repelling actions of the dogs 54b and 50a are absorbed by the torsion coil spring 72 and are not transmitted to the shifting lever 15.

[Shift from Forward high-speed State to Forward Low-speed State]

When the all-terrain vehicle shown in FIG. 3 is stopped, the variable-speed V-belt drive 27 is in the neutral state and the shifting lever 15 is set at the forward high-speed position FH, the forward dogs 54b of the shifting sleeve 54 and the dogs 50a of the forward high-speed gear 50 are engaged. Consequently, the frictional driving of the driven pulley 32 by the V belt 33 is braked completely, and the input shaft 31 is in a perfectly stopped state.

When the shifting lever 15 placed at the forward high-speed position FH is pushed forward (FIG. 9), the shifting lever 15 is stopped temporarily by the stopping edge 95 protruding into the section 92 of the guide slot 17. In this state, the forward dogs 54b of the shifting sleeve 54 is positioned temporarily at the neutral position between the dogs 50a of the forward high-speed gear 50 and the dogs 51a of the forward low-speed gear 51 (FIG. 6). Therefore, the driven pulley 32 is rotated frictionally by the V belt 33 and the input shaft 31 is rotated by a low torque so that the dog clutch is able to engage for the forward low speed ratio smoothly.

Subsequently, the shifting lever 15 shown in FIG. 9 is disengaged from the stopping edge 95 and moved to the right and then pushed forward again. Then, the shifting lever 15 is moved along the inclined section 92 and drops into the forward low-speed position recess 89.

Thus, the forward dogs 54b of the shifting sleeve 54 shown in FIG. 6 are engaged with the dogs 51a of the forward low-speed gear 51 to place the gear transmission mechanism in the forward low-speed state.

[Shift from Neutral State to Reverse State]

Referring to FIG. 9, the shifting lever 15 is moved to the right from the neutral position N and is pushed rearward. Then, the shifting lever 15 guided obliquely rearward to the left by the inclined section 90 and drops into the reverse position recess 86.

When the shifting lever 15 shown in FIG. 9 is shifted from the neutral position to the reverse position R, the connecting rod 20 shown in FIG. 4 pushes the outer change lever 23a rearward to turn the change lever shaft 21 clockwise as viewed in FIG. 8. Consequently, the inner change lever 23b is turned from the neutral position N to the left, i.e., in the direction of the arrow $S_2$ (FIG. 8).

The torsion coil spring 72 turns in the direction of the arrow $S_2$ together with the inner change lever 23b to shift the shifting pin 70 to the left to the reverse position R. Consequently, the shifting rod 61, the shifting fork 60 and the shifting sleeve 54 shown in FIG. 6 are moved from their neutral positions to the left to engage the reverse dogs 54a of the shifting sleeve 54 with the reverse dogs 52a.

Although the transmission in this embodiment has been described as applied to the all-terrain vehicle provided with the four wheels, i.e., a four-wheeled all-terrain vehicle, the transmission is applicable also to an all-terrain vehicle provided with six wheels, i.e., a six-wheeled all-terrain vehicle, etc.

The four-wheeled all-terrain vehicle with the transmission in this embodiment has the air cleaner disposed under the cover extending between the handlebar and the seat. However, the present invention is applicable also to an all-terrain vehicle having a fuel tank disposed between a handlebar and a seat.

A transmission in a second embodiment according to the present invention will be described below.

Figure 10:
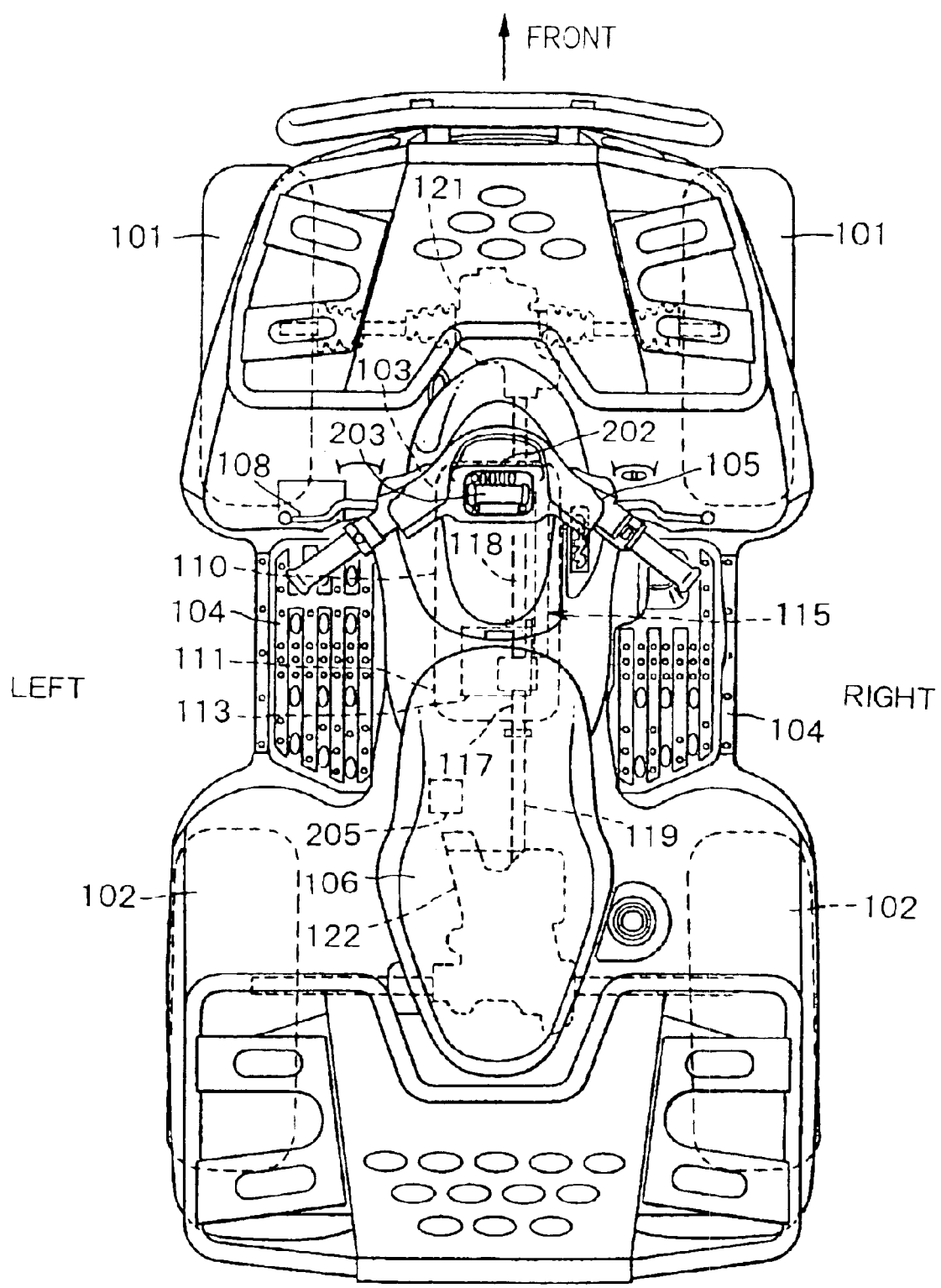
FIG. 10 is a plan view of an all-terrain vehicle to which the present invention is applied.

FIG. 10 is a plan view of a saddle-type four-wheeled all-terrain vehicle with a transmission in a second embodiment according to the present invention.

The all-terrain vehicle has a pair of front wheels 101 and a pair of rear wheels 102. An engine 103 is mounted on a part of a body between the front wheels 101 and the rear wheels 102. Steps 104 are disposed on the opposite sides of the engine 103. A handlebar 105 is supported on a front part of the body, and a saddle-type seat 106 is supported on a rear part of the frame. Operating levers including a brake lever 108 are supported on the handlebar 105 at positions near the grips of the handlebar 105. Pilot lamps 202 including a neutral-indicating pilot lamp and a reverse-indicating pilot lamp are arranged on an instrument panel 203.

The crankcase 110 of the engine 103 extends rearward. A transmission case 111 is formed integrally with the rear portion of the crankcase 110. A gear transmission mechanism 113 is built in the transmission case 111. A variable-speed V-belt drive 115 is held on the right side wall of the crankcase 110 on the upper side of the gear transmission mechanism 113 with respect to the direction of power transmission.

A drive shaft 117 is extended longitudinally under the transmission case 111. The drive shaft 117 has a front end part connected to a front propeller shaft 118 for driving the front wheels 101, and a rear end part connected to a rear propeller shaft 119 for driving the rear wheels 102. The front end part of the front propeller shaft 118 is connected to a gear mechanism held in a front reduction gear case 121. A rear end part of the rear propeller shaft 112 is connected to a gear mechanism held in a rear reduction gear case 122.

Figure 11:
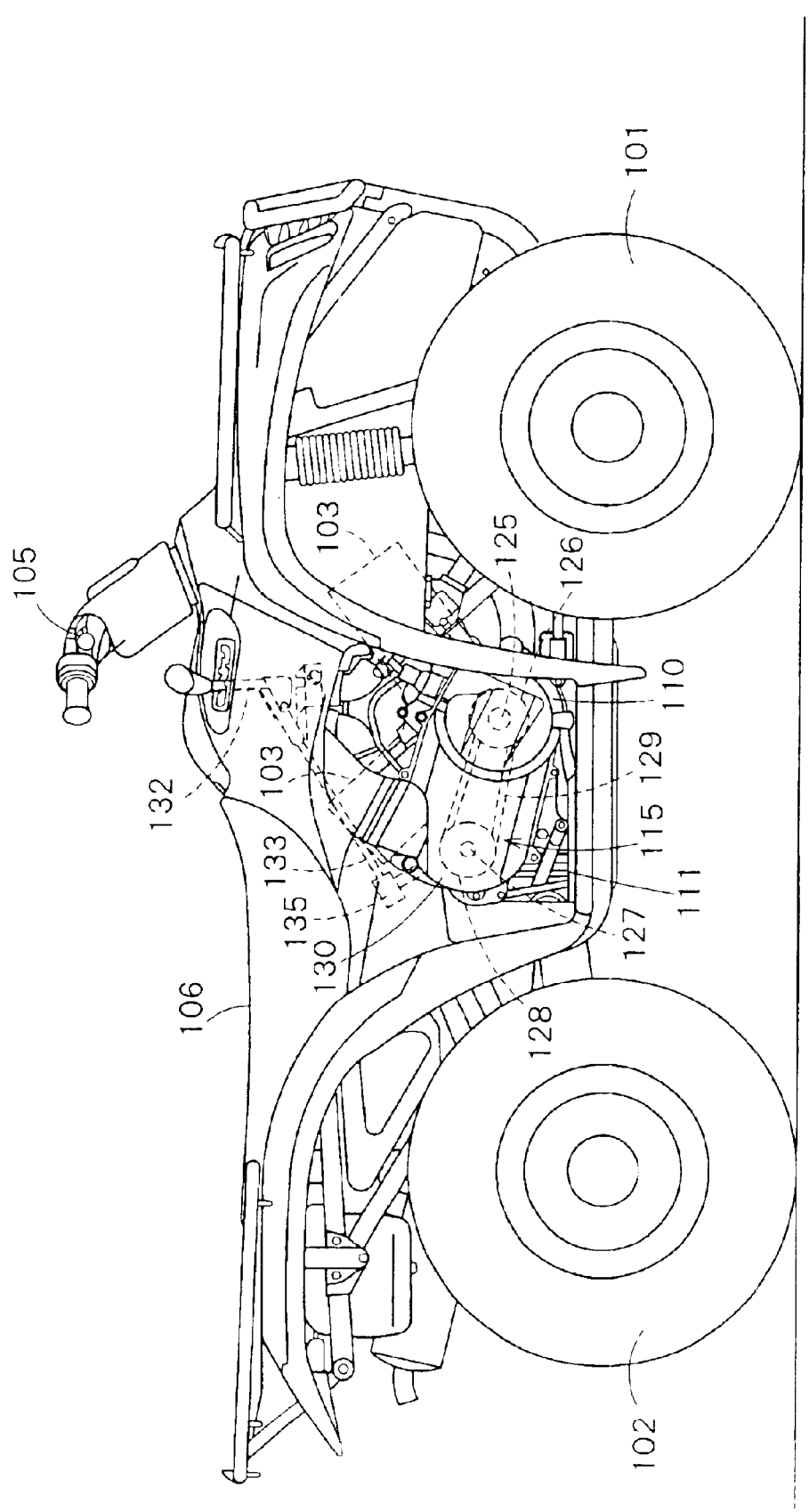
FIG. 11 is a side elevation of the all-terrain vehicle shown in FIG. 10 as viewed from the right side of the all-terrain vehicle.

Referring to FIG. 11 showing the all-terrain vehicle shown in FIG. 10 in a right side elevation, the engine 103 is a two-cylinder V-engine. The variable-speed V-belt drive 115 includes a drive pulley 126 on the front side, a driven pulley 128 on the rear side and a V-belt extended between the pulleys 126 and 128. The variable-speed V-belt drive 115 is covered with a belt-type torque converter cover 130.

A shifting lever 132 is disposed below a right end part of the handlebar 105. The shifting lever 132 is connected with an outer change lever 135 projecting upward from an upper part of the transmission case 111 by a connecting rod 133.

[Variable-speed V-belt Drive]

Figure 13:
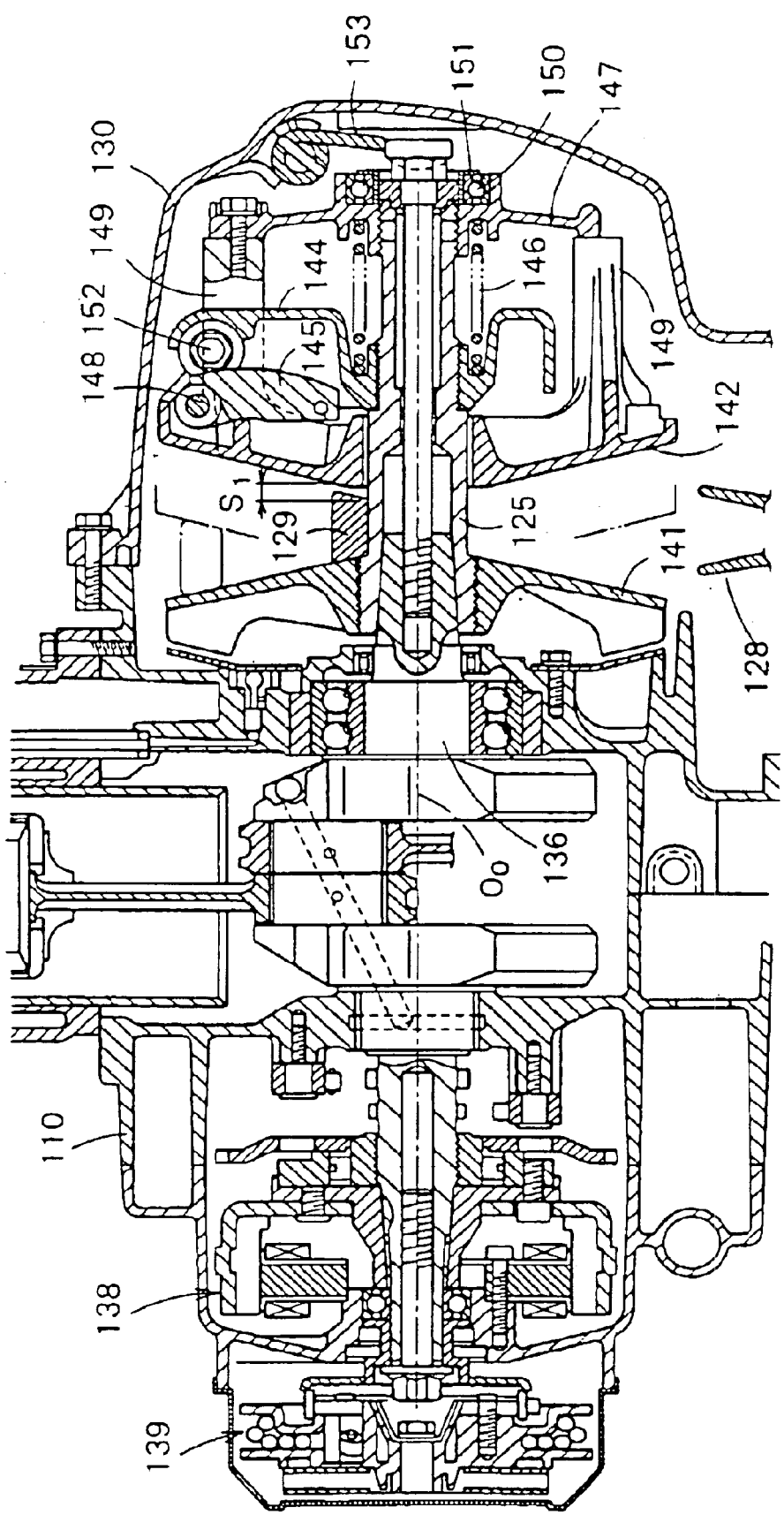
FIG. 13 is a longitudinal sectional view of a part of an engine around a crankshaft.

Referring to FIG. 13 showing mechanisms built in the crankcase 110 in a longitudinal sectional view, a drive shaft 125 supporting the drive pulley 126 is coaxially connected to a right end part of a crankshaft 136. A generator 138 and a recoil starter 139 are mounted on a left end part of the crankshaft 136. The drive pulley 126 (shown in Fin. 11) includes a fixed sheave 141 and a movable sheave 142 disposed on the right side of the fixed sheave 141. The fixed sheave 141 is fixedly mounted on the drive shaft 125. The movable sheave 142 is interlocked with the drive shaft 125 by a spider 144. The movable sheave 142 rotates together with the drive shaft 125 and is axially movable on the drive shaft 125.

A thrusting mechanism including the spider 144, a plurality of flyweights 145, a pressure regulating spring 146 and a support plate 147 is disposed on the back side of the movable sheave 142, i.e., on the right side of the movable sheave 142. The flyweights 145 are supported pivotally on the back side of the movable sheave 142 by a plurality of pins 148, respectively. The flyweights 145 are turned gradually to the right, i.e., away from the movable sheave 142, on the pins 148 by centrifugal force as the rotating speed of drive shaft 125 increases. A connecting arm 149 extends from the back surface of the movable sheave 142 through the spider 144 to the right. The support plate 147 is connected to the right end of the connecting arm 149. The support plate 147 is mounted on the drive shaft 125 for axial movement relative to the drive shaft 125. A bearing 150 is fitted in a boss formed on the support plate 147. An annular seat 151 is fitted in the inner ring of the bearing 150. A restricting lever 153 for maintaining engine brake effective is in contact with the annular seat 151.

The spider 144 is disposed on the right side of the movable sheave 142 and is screwed to the drive shaft 125. Rollers 152 in contact with the flyweights 145 are supported on the spider 144. The pressure regulating spring 146 is compressed between the spider 144 and the support plate 147 to bias the support plate 147 to the right, so that the movable sheave 142 is biased to the right indirectly through the connecting arm 149. Thus, the movable sheave 142 of the drive pulley 126 is biased away from the fixed sheave 141 of the same. When the flyweights 145 are turned away from the movable sheave 142 as the engine speed increases, the movable sheave 142 is moved together with the support plate 147 by reaction force exerted thereon by the rollers 152 against the resilience of the pressure regulating spring 147 to compress the V belt 129 between the fixed sheave 141 and the movable sheave 142.

Figure 14:
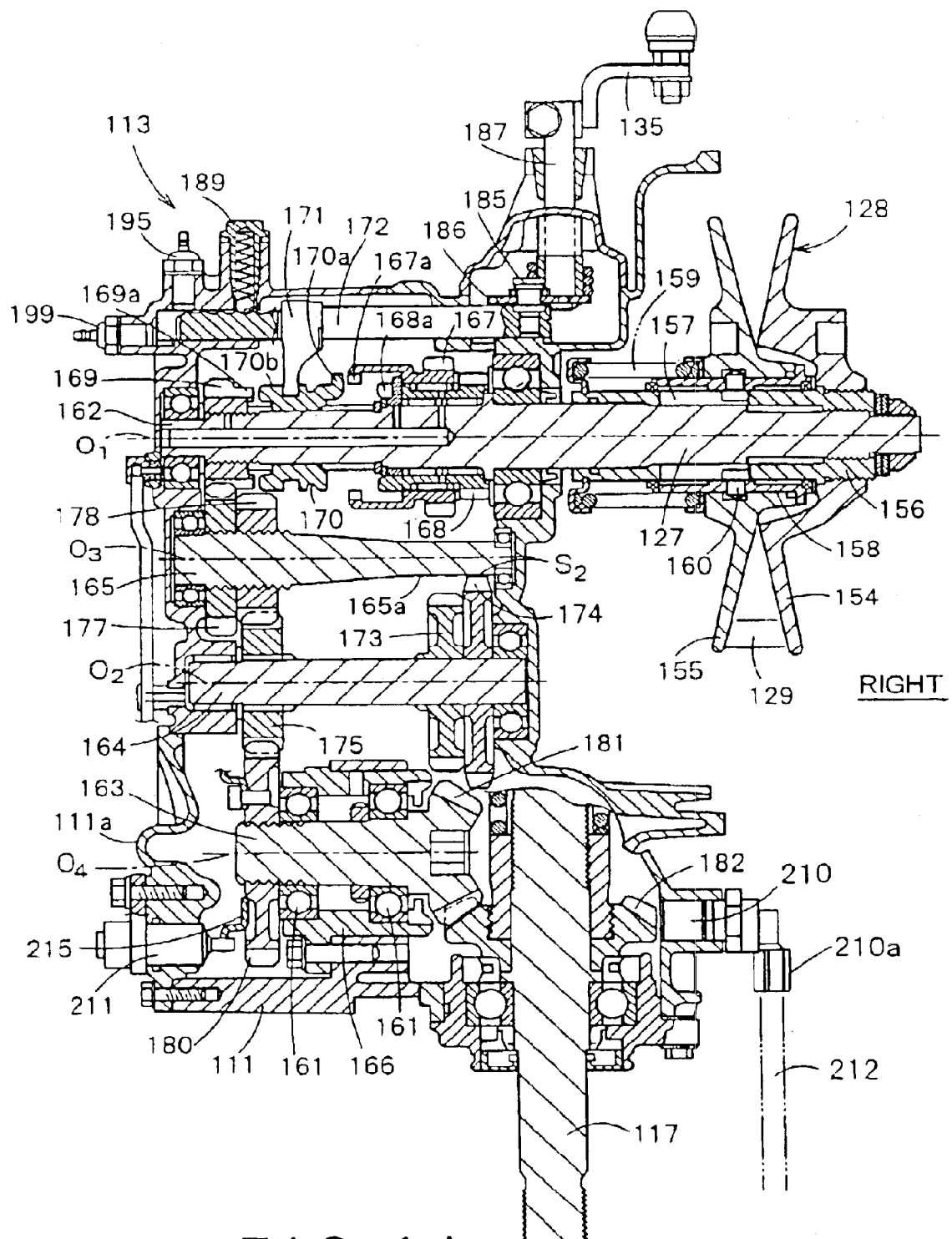
FIG. 14 is a sectional development of a transmission mechanism formed in the transmission case.

Referring to FIG. 14, the driven pulley 128 has a fixed sheave 154 on the right side and a movable sheave 155 on the left side. The fixed sheave 154 is fixedly mounted on a tubular cam shaft 156 fixed to a driven shaft 127. The fixed sheave 154 is incapable of rotating and axially moving relative to the cam shaft 156. The cam shaft 156 is provided with a plurality of helical guide grooves 157. A sleeve 158 fixedly fitted in a central hole formed in the movable sheave 155 is mounted on the cam shaft 156 for rotation and axial movement relative to the cam shaft 156. The sleeve 158 is biased toward the fixed sheave 154 by a pressure regulating spring 159. Cam rollers 160 supported on the sleeve 158 are slidably engaged in the guide grooves 157.

When the movable sheave 155 is turned in a rotating direction by an increased torque exerted thereon by the V-belt 129, the movable sheave 155 is biased toward the fixed sheave 154 by the cam action of the cam rollers 160 and the guide grooves 157, so that pressure compressing the V-belt 129 increases.

[Gear Transmission Mechanism and Shifting Mechanism]

Figure 15:
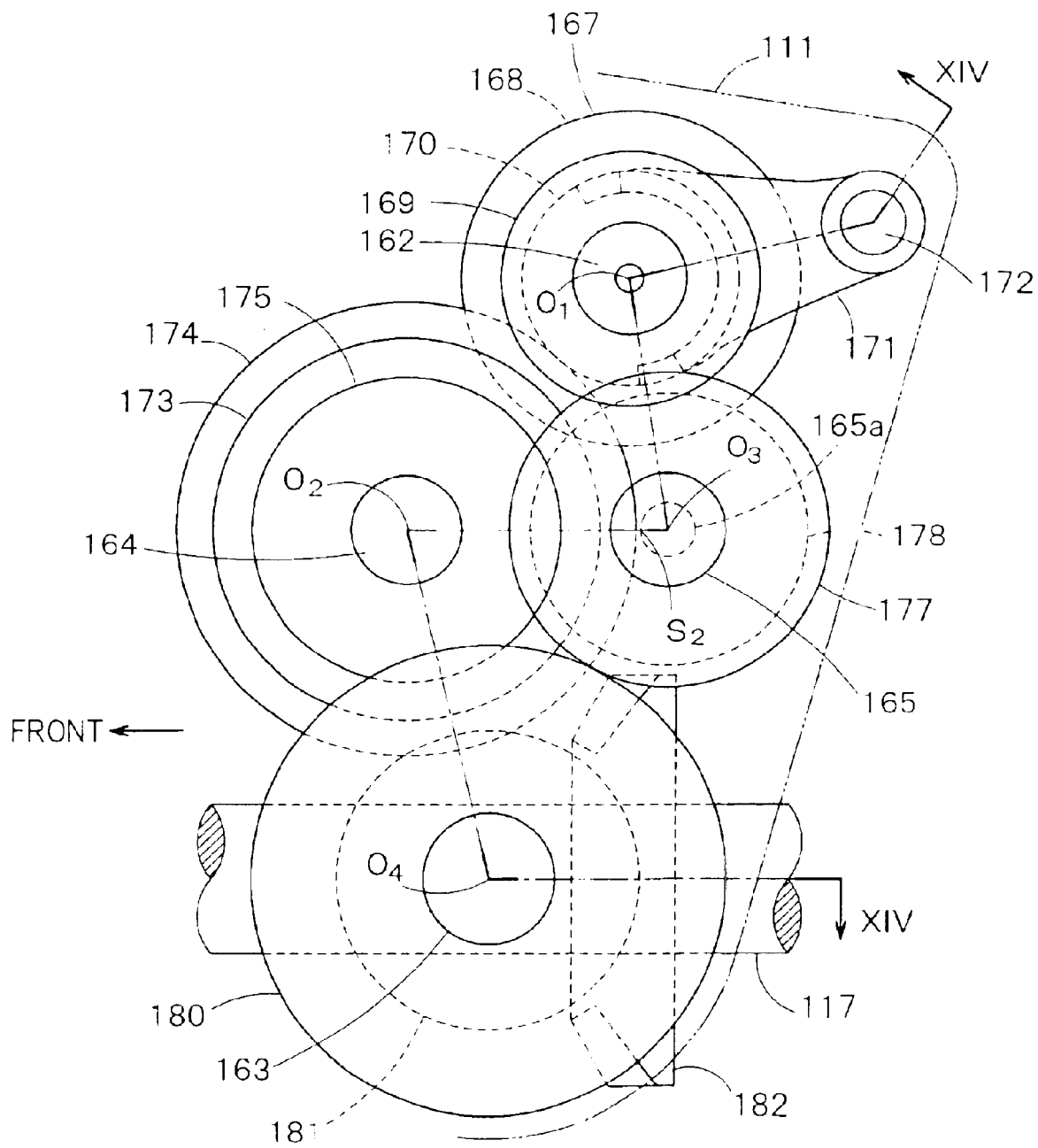
FIG. 15 is a sectional side view showing the arrangement of shafts in the transmission case.

Referring to FIG. 15 showing the arrangement of shafts in the transmission case 111 formed integrally with the crankcase 110, an input shaft 162 is extended laterally in an upper region in the transmission case 111, an output shaft 163 is extended in parallel to the input shaft 162 in a lower region in the transmission case 111. A counter shaft 164 is extended in parallel to the input shaft 162 on the front side of a plane including the axis $O_1$ of the input shaft 162 and the axis $O_4$ of the output shaft 163. A reversing idle shaft 165 is extended in parallel to the input shaft 162 on the rear side of the same plane. The counter shaft 164 and the reversing idle shaft 165 are on substantially the same level. A shifting rod 172 is disposed in parallel to the input shaft 162 obliquely above and behind the input shaft 162.

The counter shaft 164, on which a forward low-speed intermediate gear 174 having the greatest diameter among those of gears included in the gear transmission mechanism is mounted, is disposed in a front region in which a relatively large space is available. The reversing idle shaft 165 is disposed in a rear region. Therefore, the back wall of the transmission case 111 does not need to be bulged rearward. The drive shaft 117 and the output shaft 163 are on substantially the same level.

FIG. 14 is a developed sectional view in planes including the axes $O_1$, $O_2$, $O_3$ and $O_4$ of the shafts of the gear transmission mechanism, i.e., a sectional view taken on line XIV—XIV in FIG. 15. Referring to FIG. 14, the input shaft 162 is formed integrally with the driven shaft 127 supporting the driven pulley 128. Opposite ends of the input shaft 162, the counter shaft 164 and the reversing idle shaft 165 are supported in bearings on the right and the left side wall of the transmission case 111. The output shaft 163, which is shorter than the shafts 162, 164 and 165, is supported in bearings 161 on a shaft holder 166 fixedly disposed in the transmission case 111. The drive shaft 117 is extended on the right side of the output shaft 163.

A forward high-speed gear 167 and a forward low-speed gear 168 are mounted axially contiguously on a right end part of the input shaft 162. A reverse gear 169 is mounted on a left end part of the input shaft 162. A shifting sleeve 170 included in a dog clutch mechanism is splined onto a middle part of the input shaft 162 so as to be axially movable on the input shaft 162.

The reverse gear 169 is provided on its right end surface with dogs 169a and is supported for rotation by a needle bearing on the input shaft 162. The forward low-speed gear 168 has a boss extending to the left and provided on its left end with dogs 168a. The forward low-speed gear 168 is supported for rotation by a needle bearing on the input shaft 162. The forward high-speed gear 167 has an arm extending to the left and provided on its left end with dogs 167a projecting radially inward. The forward high-speed gear 167 is supported for rotation by a needle bearing on the boss of the forward low-speed gear 168. Forward-drive dogs 170a and reverse-drive dogs 170b are formed on the right and the left end surface of the shifting sleeve 170, respectively.

The distance between the dogs 167a and 168a is determined so that the forward-drive dogs 170a of the sleeve 170 can be temporarily located at a neutral position.

A single shifting fork 171 fixed to the shifting rod 172 is engaged in a circular groove formed in the outer circumference of the shifting sleeve 170. The shifting rod 172 is supported for lateral movement on the transmission case 111. In FIG. 14, the shifting sleeve 170 is located at the neutral position. The reverse-drive dogs 170b of the shifting sleeve 170 are engaged with the dogs 169a of the reverse gear 169 when the shifting sleeve 170 is shifted to the left from the neutral position. When the shifting sleeve 170 is moved to the right from the neutral position, the forward-drive dogs 170a of the shifting sleeve 170 are engaged with the dogs 167a of the forward high-speed gear 167. When the shifting sleeve 170 is shifted further via the neutral position to the right, the forward-drive dogs 170a of the shifting sleeve 170 are disengaged from the dogs 167a of the forward high-speed gear 167 and are engaged with the dogs 168a of the forward low-speed gear 168. Thus, the gear transmission mechanism can be placed in desired one of a forward high-speed ratio, a forward low-speed ratio, neutral and reverse by moving the single shifting fork 171.

A change pin 185 projects upward from a right end part of the shifting rod 172. An internal change lever 186 is engaged with the change pin 185. The internal change lever 186 is connected to the external change lever 135 by a change lever shaft 187.

Forward intermediate gears 173 and 174 are fixedly mounted on a right end part of the counter shaft 164 and are engaged with the forward high-speed gear 167 and the forward low-speed gear 168, respectively. An intermediate output gear 175 is fixedly mounted on a left end part of the counter shaft 164.

A large-diameter first reverse idle gear 177 and a small-diameter second reverse idle gear 178 are fixedly mounted on a left end part of the reverse idle shaft 165. The first reverse idle gear 177 and the second reverse idle gear 178 are engaged with the reverse gear 169 and the intermediate output gear 175, respectively. A right part 165a of the reverse idle shaft 165 is formed in a diameter smaller than that of a left part of the same. A very small clearance $S_2$ is formed between the circumference of the right part 165a of the reverse idle shaft 165 and the outer circumference of the forward low-speed intermediate gear 174 having the largest diameter among the gears mounted on the counter shaft 164. Thus, the gear transmission mechanism is formed so that the center distance between the counter shaft 164 and the reverse idle shaft 165 is reduced to the shortest possible extent.

The intermediate output gear 175 is engaged with an output gear 180 fixedly mounted on a left end part of the output shaft 163. A bevel gear 181 formed integrally with a right end part of the output shaft 163 is engaged with a bevel gear 182 fixedly mounted on the drive shaft 117.

[Detent Mechanism]

Figure 16:
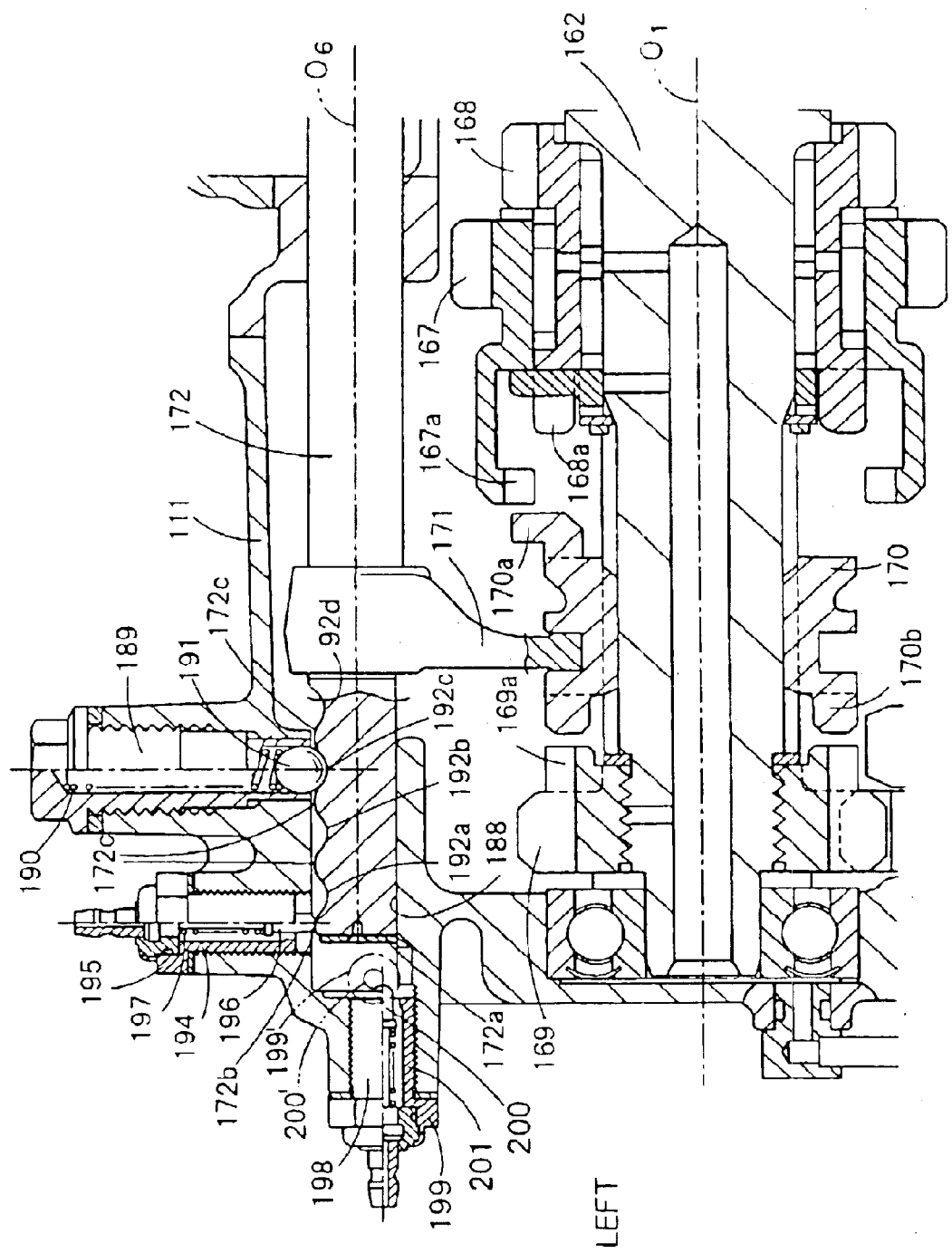
FIG. 16 is an enlarged longitudinal sectional view of a shifting rod and associated parts.
Figure 17:
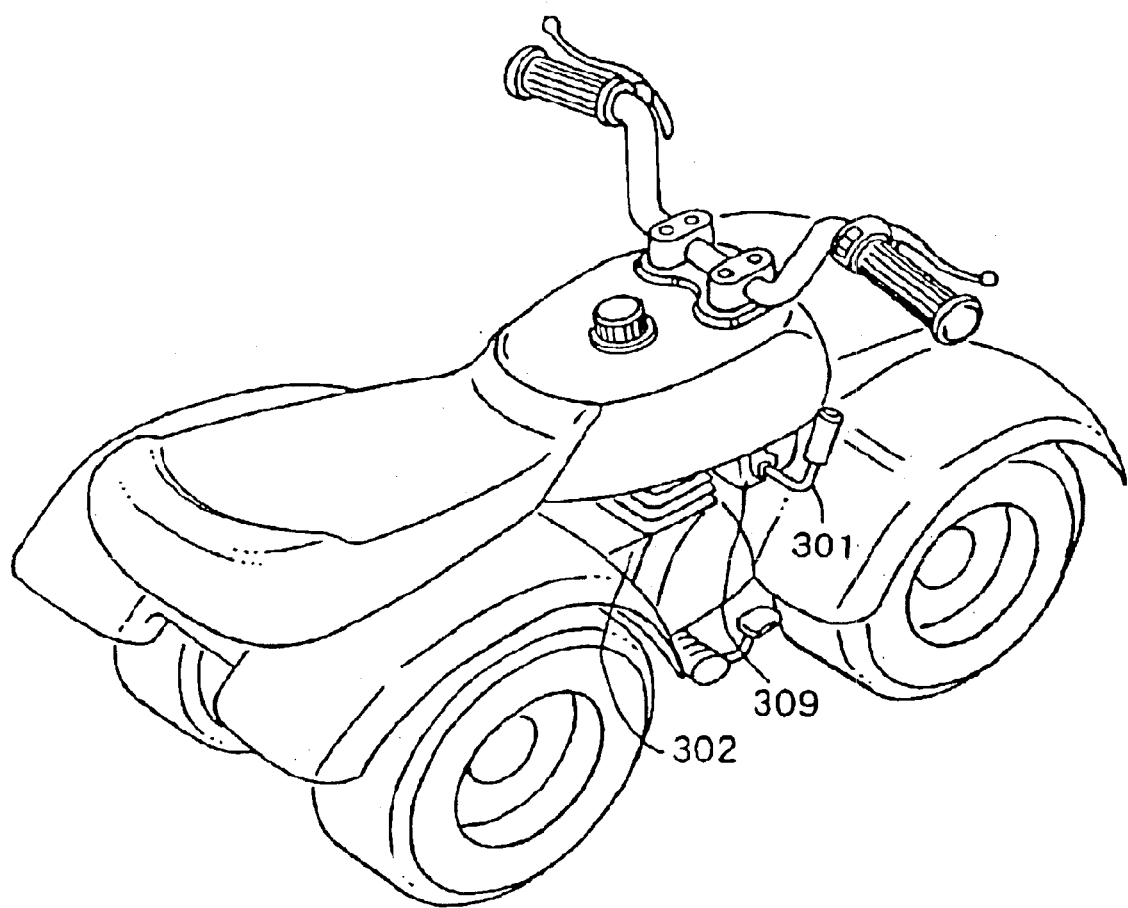
FIG. 17 is a perspective view of a conventional all-terrain vehicle.
Figure 18:
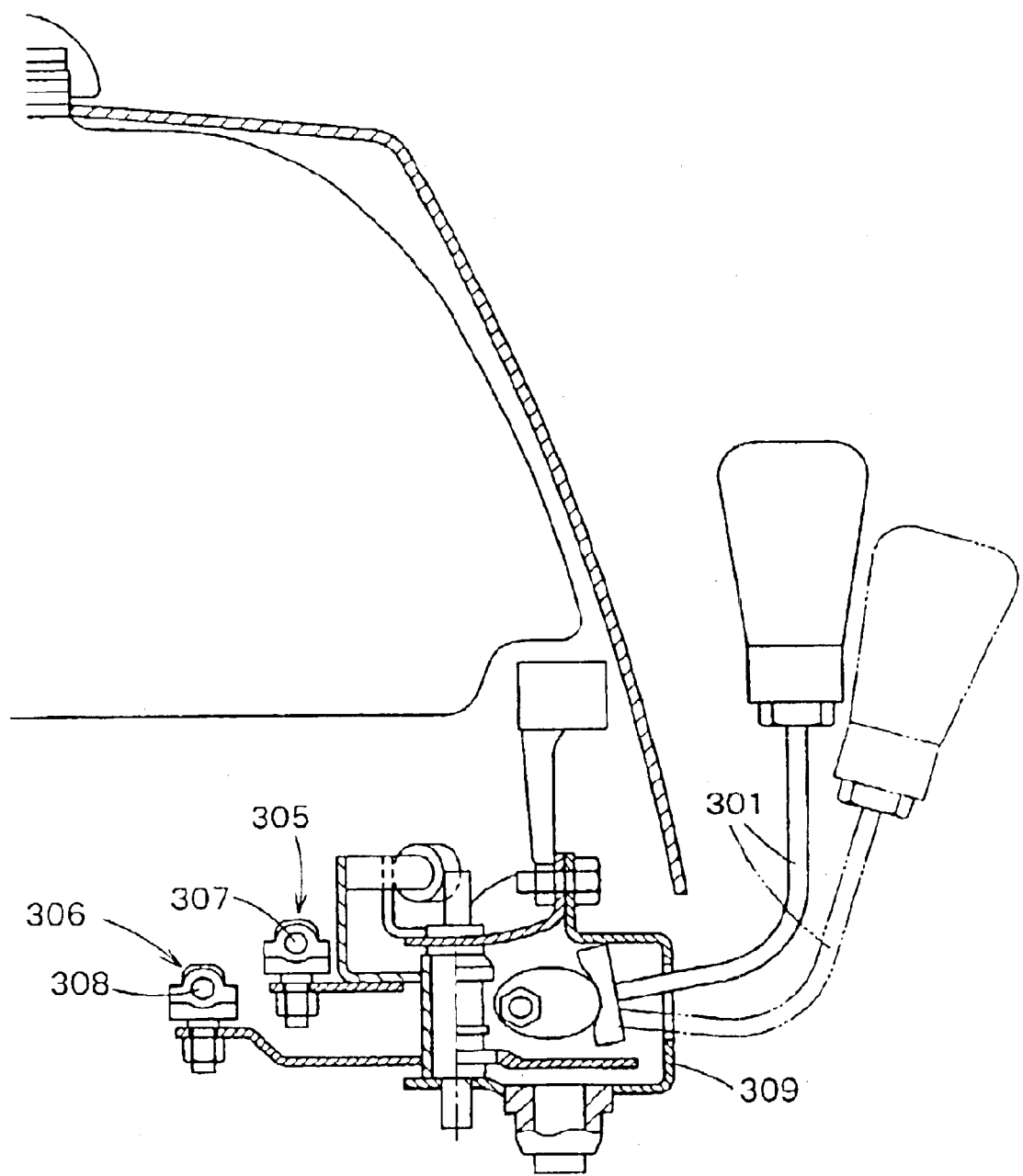
FIG. 18 is an enlarged longitudinal sectional view of a shifting lever and associated parts shown in FIG. 17.
Figure 19:
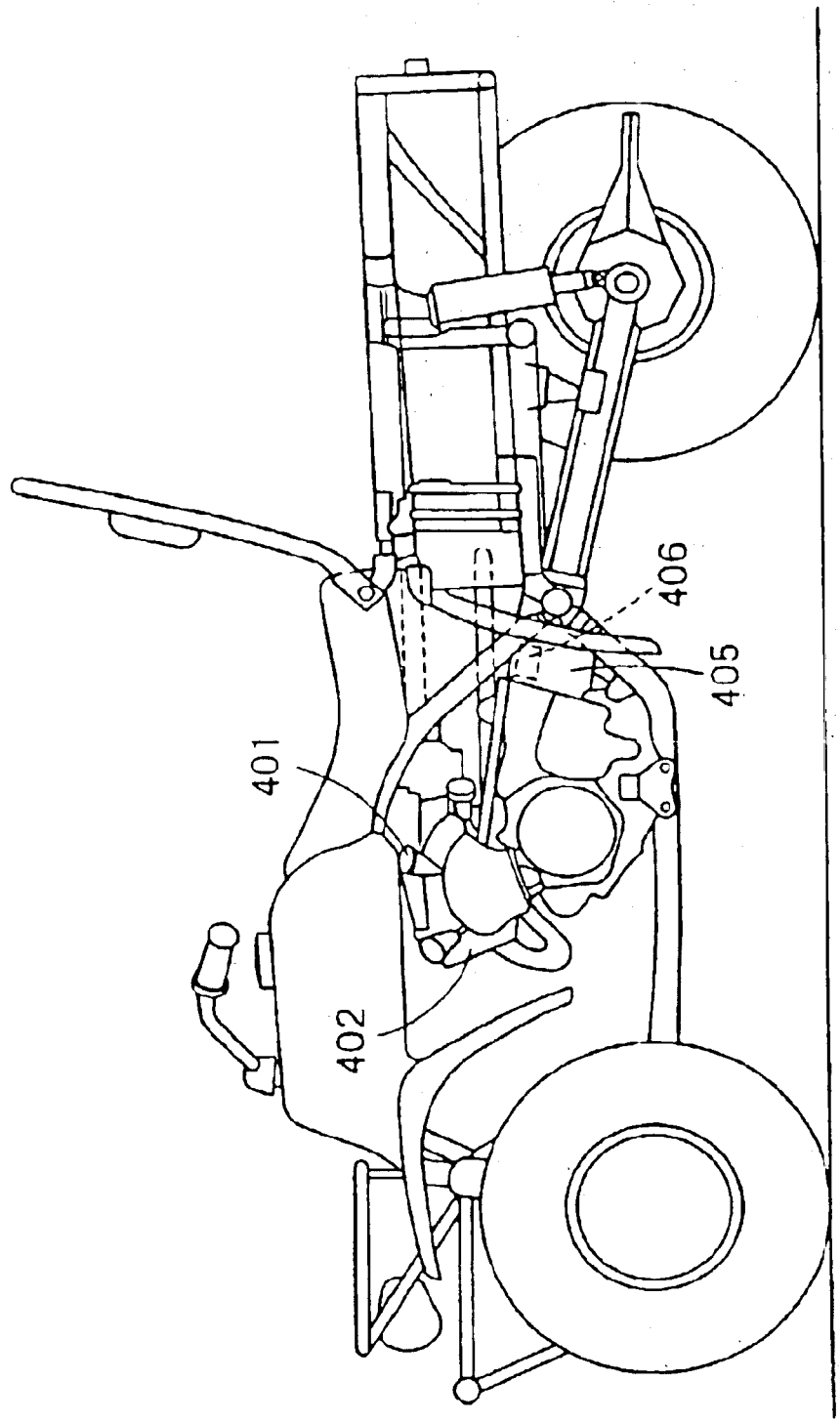
FIG. 19 is a side elevation of another conventional all-terrain vehicle.

Referring to FIG. 16 showing the shifting rod 172 and the associated parts in an enlarged longitudinal sectional view, four notches 192a, 192b, 192c and 192d are formed in that order from left to right at predetermined axial intervals in a left end part of the shifting rod 172 on the left side of the shifting fork 171. The notches 192a, 192b, 192c and 192d correspond to positions of the shifting rod 172 for the forward low-speed ratio, the forward high-speed ratio, neutral and reverse, respectively. An externally threaded, tubular detent case 189 is screwed in a threaded hole formed in the wall of the transmission case 111. A detent ball 191 is placed in the detent case 189 so as to be movable therein and is biased by a spring 190 so as to engage in one of the notches 192a, 192b, 192c and 192d. A neutral-position indicating protrusion 172b is formed between the leftmost notch 192a and the left end surface 172a of the shifting rod 172 so as to be in sliding contact with the side surface of a bore 188 in which a left end part of the shifting rod 172 is inserted. Protrusions 172c between the notches 192a, 192b, 192c and 192d are lower than the neutral-position indicating protrusion 172b and are spaced from the side surface of the bore 188 when the left end part of the shifting rod 172 is inserted in the bore 188.

Since the neutral-position indicating protrusion 172b is formed contiguously with the leftmost notch 192a, the neutral-position indicating protrusion 172b can be formed simultaneously with forming the notches 192a, 192b, 192c and 192d or successively after forming the notches 192a, 192b, 192c and 192d. Therefore, the neutral-position indicating protrusion 172b formed at the left end of the shifting rod 172 scarcely increases machining steps.

[Gear-Position Detecting Switch]

The bore 188, in which the left end part of the shifting rod 172 is axially slidably fitted, is formed in the left wall of the transmission case 111. A reverse-position detecting switch 199 is disposed at axially left end of the bore 188, and a neutral-position detecting switch 195 is disposed radially outside the bore 188. The neutral-position detecting switch 195 and the reverse-position detecting switch 199 are connected to the neutral-indicating pilot lamp and the reverse-indicating pilot lamp among the pilot lamps 202 arranged on the instrument panel 203 shown in FIG. 10. The neutral-position detecting switch 195 and the reverse-position detecting switch 199 shown in FIG. 16 are the same in basic construction, although they are disposed at different positions. The neutral-position detecting switch 195 and the reverse-position detecting switch 199 include springs 197 and 201, detecting pins 196 and 200, respectively. The detecting pins 196 and 200 are biased toward the shifting rod 172 by the springs 197 and 201, respectively. When the detecting pins 196 and 200 are pushed back into switch cases, the neutral-position detecting switch 195 and the reverse-position detecting switch 199 are closed, respectively.

The reverse-position detecting switch 199 is screwed in a threaded hole 198 formed in the left side wall of the transmission case 111 with its axis extended in parallel to the axis $O_6$ of the shifting rod 172. The detecting pin 200 is movable along the axis $O_6$ of the shifting rod 172. Normally, the detecting pin 200 projects into the bore 188. When the shifting rod is moved to the left end position corresponding to the reverse position, the left end surface 172a of the shifting rod 172 pushes the detecting pin 200 to close the reverse-position detecting switch 199, so that the arrival of the shifting rod 172 at the reverse position is detected.

The neutral-position detecting switch 195 is screwed in a threaded hole 194 formed in the left side wall of the transmission case 111 with its axis extended perpendicularly to the axis $O_6$ of the shifting rod 172. The detecting pin 196 extends perpendicularly to the axis $O_6$ of the shifting rod 172. When the shifting rod 172 is moved to the left and to the neutral position as shown in FIG. 16, the neutral-position indicating protrusion 172b formed between the leftmost notch 192a and the left end surface 172a of the shifting rod 172 pushes the detecting pin 196 back into the switch case to close the neutral-position detecting switch 195, so that the arrival of the shifting rod 172 at the neutral position is detected. Since the neutral-position indicating protrusion 172b is in sliding contact with the side surface of the bore 188, the neutral-position indicating protrusion 172b is able to engage the detecting pin 196 of the neutral-position detecting switch 195. However, since the protrusions 172c between the notches 192a, 192b, 192c and 192d are lower than the neutral-position indicating protrusion 172b and are spaced from the side surface of the bore 188, the protrusions 172c are unable to engage the detecting pin 196 even if when the shifting rod 172 is moved to the leftmost position.

Figure 12:
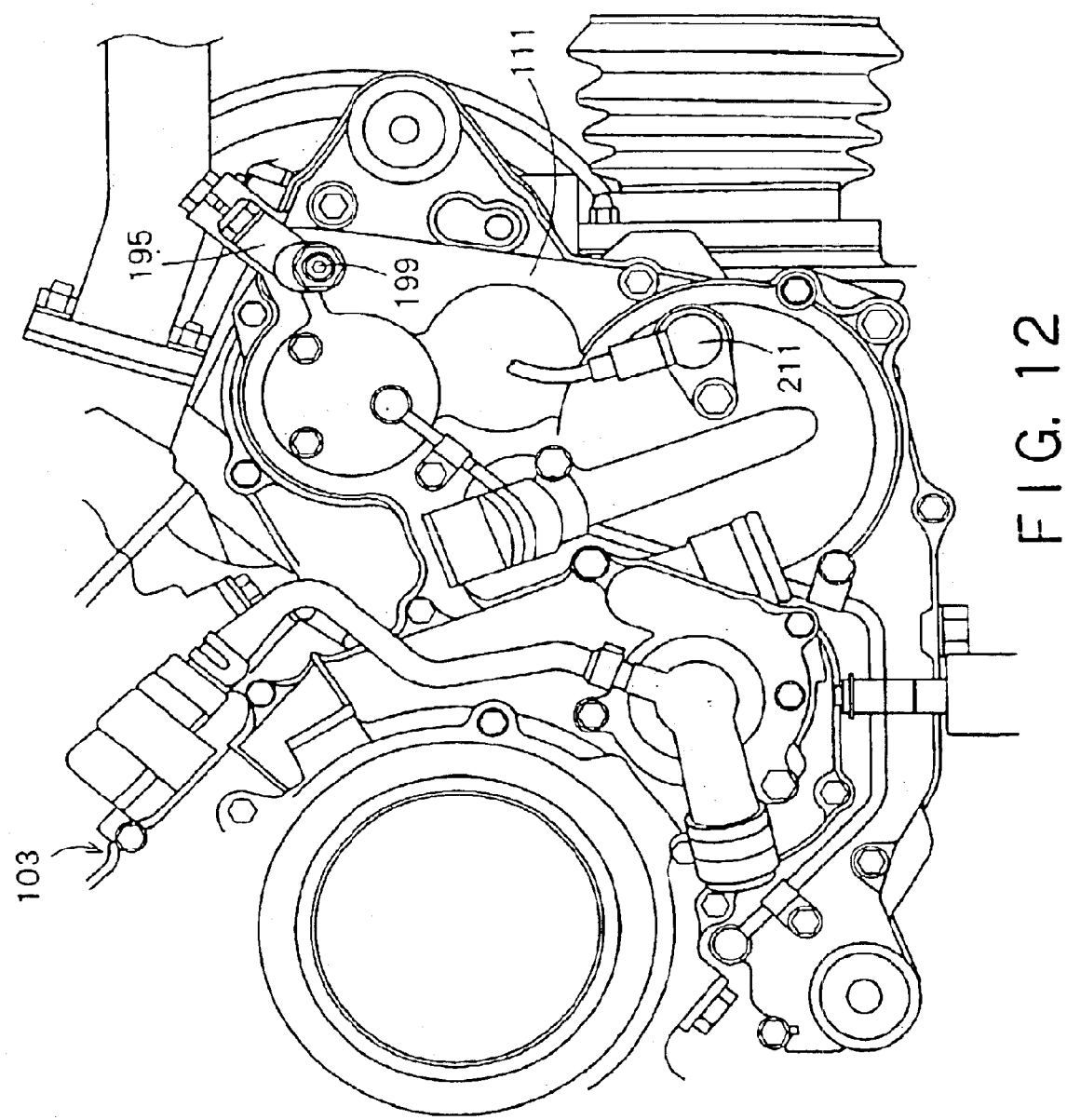
FIG. 12 is a side elevation of a transmission case as viewed from the left side.

Referring to FIG. 12 showing the left surface of the transmission case 111 in a side elevation, the neutral-position detecting switch 195 and the reverse-position detecting switch 199 are disposed in a rear upper end part of the transmission case 111. The neutral-position detecting switch 195 is placed with its axis tilted rearward.

[Speed Sensor and Traveling-Direction Sensor]

Referring to FIG. 14, a traveling-direction sensor 211 and a speed sensor 210 are disposed at opposite positions in a lower end part of the transmission case 111, respectively. The speed sensor 210 is fixed to the right side wall of the transmission case 111 diametrically opposite to the bevel gear 182 fixed to the drive shaft 117. A cable connector 210a is extended rearward from the speed sensor 210 and a signal cable 212 is connected detachably to the cable connector 210a.

The operation of the second embodiment will be described.

[Whole Power Transmission]

Referring to FIG. 10, the driving power of the engine 103 is transmitted through the variable-speed V-belt drive 115, the gear transmission mechanism 113, the drive shaft 117, and the front propeller shaft 118 and the rear propeller shaft 119 to the front wheels 101 and the rear wheels 102.

[Shifting Operation]

The shifting lever 132 shown in FIG. 11 is operated by hand to turn the inner change lever 186 through the connecting rod 133, the outer change lever 135 and the change lever shaft 187 (FIG. 14). Consequently, the shifting rod 172 is moved axially to the desired one of the forward low-speed position, the forward high-speed position, the neutral position and the reverse position.

(1) Neutral Position

In FIG. 16, the shifting rod 172 is placed at the neutral position, in which the detent ball 191 is engaged in the notch 192c for the neutral position, i.e., the third notch from the left, the detecting pin 196 of the neutral-position detecting switch 195 is pushed axially outward by the neutral-position indicating protrusion 172b formed at the left end of the shift rod 172 to close the neutral position detecting switch 195. On the other hand, the left end surface 172a of the shifting rod 172 is spaced from the detecting pin 200 of the reverse-position detecting switch 199 and hence the reverse-position detecting switch 199 is opened. The neutral-indicating pilot lamp 202 of the instrument panel 203 is turned on.

(2) Reverse Position

When the shifting rod 172 is moved from the neutral position shown in FIG. 16 to the left, the shifting sleeve 170 is moved to the left, the reverse-drive dogs 170b are engaged with the dogs 169a of the reverse gear 169 to place the gear transmission mechanism in reverse. In this stage, the detent ball 191 is engaged in the notch 192d for reverse, the detecting rod 196 of the neutral position detecting switch 195 is separated from the surface of the shifting rod 172, and the detecting pin 200 of the reverse-position detecting switch 199 is pushed axially by the left end surface 172a of the shifting rod 172. Consequently, the reverse-position indicating pilot lamp 202 of the instrument panel 203 shown in FIG. 10 is turned on.

(3) Forward Position

When the shifting rod 172 is moved to the right from the neutral position shown in FIG. 16, the shifting sleeve 170 is moved to the right. First the forward-drive dogs 170a are engaged with the dogs 167a of the forward high-speed gear 167 to place the gear transmission mechanism in the forward high-speed ratio. In this state, the detent ball 191 is engaged in the notch 192b for the forward high-speed ratio, i.e., the second notch from the left, and the respective detecting pins 196 and 200 of the neutral-position detecting switch 195 and the reverse-position detecting switch 199 are separated from the shifting rod 172.

When the shifting rod 172 is moved further to the right, the forward-drive dogs 170a are moved past the neutral position and are engaged with the dogs 168a of the forward low-speed gear 168 to place the gear transmission mechanism in the forward low-speed ratio. In this stage, the detent ball 191 is engaged in the leftmost notch 192a for the forward low-speed ratio, the respective detecting pins 196 and 200 of the neutral-position detecting switch 195 and the reverse-position detecting switch 199 are separated from the shifting rod 172, and the neutral-position detecting switch 195 and the reverse-position detecting switch 199 are opened.

In the mechanism shown in FIG. 16, the reverse-position detecting switch 199 is screwed in the threaded hole formed in the left side wall of the transmission case 111 with the axis of the detecting pin 200 thereof extended in parallel to the axis $O_6$ of the shifting rod 172. The reverse-position detecting switch 199' maybe disposed with the axis of the detecting pin 200 thereof extended radially to the shifting rod 172. When the reverse-position detecting switch 199' is thus disposed, the reverse-position detecting switch 199' is set at an angular position with respect to the axis $O_6$ of the shifting rod 172 different from that of the neutral-position detecting switch 195 such that the extremity of the detecting pin 200' is located near the left end surface of the bore 188 as indicated by imaginary lines.

Although the mechanism shown in FIG. 16 includes the neutral-position detecting switch 195 and the reverse-position detecting switch 199, a single position detecting switch provided with a reverse-position detecting pin and a neutral-position detecting pin may be used instead of the two position detecting switches 195 and 199.

Moreover, the present invention is applicable to a gear transmission mechanism provided with two shifting rods.

What is claimed is:

1. A transmission for an all-terrain vehicle with an engine comprising:

a variable-speed drive operatively connected to the engine, and a gear transmission mechanism operatively connected to the variable-speed drive, the gear transmission mechanism including:

a single shifting fork for selecting at least a forward high-speed ratio, a forward low-speed ratio, neutral and reverse, a shifting lever disposed at a position below a right end part or a left end part of a handlebar at a level above the engine, the shifting lever extending substantially upward, a single change lever shaft connected with the shifting fork, the change lever shaft being disposed on the same side as the side on which the shifting lever is disposed with respect to a longitudinal center axis of the all-terrain vehicle, and the change lever shaft extending substantially upward at an end part of a rear end part of the engine, and a single connecting member connecting the change lever shaft and the shifting lever, the connecting member including a substantially straight single connecting rod extending in a back-and-forth direction at a right or left side with respect to the engine.

2. The transmission for an all-terrain vehicle according to claim 1, wherein the gear transmission mechanism further comprises a torsion coil spring wound around the change lever shaft so as to connect the change lever shaft and the shifting fork via the torsion coil spring.

3. The transmission for an all-terrain vehicle according to claim 1, wherein the gear transmission mechanism further comprises a gate member provided with a longitudinal guide slot extending in the back-and-forth direction for guiding the shifting lever, the guide slot being provided in the same side edge of right or left with retaining parts for retaining the shifting lever at positions corresponding to the forward low-speed ratio, the forward high-speed ratio, neutral and reverse.

4. The transmission for an all-terrain vehicle according to claim 3, wherein an intermediate stopper for temporarily holding the shifting lever in a neutral state is formed in a section of the guide slot between the retaining part for the forward high-speed ratio and the retaining part for the forward low-speed ratio.

5. The transmission for an all-terrain vehicle according to claim 3, wherein the shifting lever is supported for turning by a spherical bearing mechanism such that the shifting lever can be tilted forward, rearward, rightward and leftward, the shifting lever being biased by a spring toward the side edge of the guide slot in which the retaining parts are provided.

6. A gear position detector for an all-terrain vehicle with a gear transmission mechanism disposed in a transmission case, the gear transmission mechanism including a single shifting rod for changing gear position by an axial movement of the single shifting rod, comprising:

a gear-position detecting switch mounted to the transmission case at a position near one axial end of the single shifting rod, the gear-position detecting switch being configured to detect a neutral position when the axial end of the single shifting rod axially moves to a neutral position and engages the gear-position detecting switch or a reverse position when the axial end of the single shifting rod axially moves to a reverse position and engages the gear-position detecting switch.

7. The gear position detector for an all-terrain vehicle according to claim 6, wherein the gear transmission mechanism can be selectively placed in one of two forward speeds, neutral and reverse by operating a single shifting rod, and wherein the gear-position detecting switch is disposed so as to detect the neutral and reverse positions with respect to the single shifting rod.

8. The gear position detector for an all-terrain vehicle according to claim 7, wherein the gear-position detecting switch includes a neutral-position detecting switch and a reverse-position detecting switch which are independently mounted from each other.

9. The gear position detector for an all-terrain vehicle according to claim 8, wherein the reverse-position detecting switch is disposed opposite to one axial end of the single shifting rod, and wherein the neutral-position detecting switch is disposed near the same axial end of the single shifting rod at a position radially outside the single shifting rod.

10. A transmission for an all-terrain vehicle comprising:

a transmission case, a gear transmission mechanism disposed in the transmission case, the gear transmission mechanism including an axially movable shifting rod for changing gear ratio by an axial movement of the shifting rod, and a gear-position detecting switch attached to the transmission case at a position near one axial end of the shifting rod, the gear-position detecting switch being configured to detect a neutral position when the axial end of the shifting rod axially moves to a neutral position and engages the gear-position detecting switch or a reverse position when the axial end of the shifting rod axially moves to a reverse position and engages the gear-position detecting switch.

11. The transmission for an all-terrain vehicle according to claim 10, wherein the gear transmission mechanism can be selectively placed in one of two forward speeds, neutral and reverse by the shifting rod, and wherein the gear-position detecting switch is disposed so as to detect the neutral and reverse positions with respect to the shifting rod.

12. The transmission for an all-terrain vehicle according to claim 11, wherein the gear-position detecting switch includes a neutral-position detecting switch and a reverse-position detecting switch which are independently mounted from each other.

13. The transmission for an all-terrain vehicle according to claim 12, wherein the reverse-position detecting switch is disposed opposite to one axial end of the shifting rod, and wherein the neutral-position detecting switch is disposed near the same axial end of the shifting rod at a position radially outside of the shifting rod.

14. A transmission for an all-terrain vehicle with an engine comprising:

a variable-speed drive operatively connected to the engine, and a gear transmission mechanism operatively connected to the variable-speed drive, the gear transmission mechanism including:

a single shifting fork for selecting at least a forward high-speed ratio, a forward low-speed ratio, neutral and reverse, a shifting lever disposed at a position below a right end part or a left end part of a handlebar at a level above the engine, the shifting lever extending substantially upward, a single change lever shaft connected with a shifting fork, the change lever shaft being disposed on the same side as the side on which the shifting lever is disposed with respect to a longitudinal center axis of the all-terrain vehicle, and the change lever shaft extending substantially upward at a rear end part of the engine, and a single connecting member connecting the change lever shaft and the shifting lever, the connecting member extending at a right or left side with respect to the engine, wherein the gear transmission mechanism further comprises a torsion coil spring wound around the change lever shaft so as to connect the change lever shaft and the shifting fork via the torsion coil spring.

15. A transmission for an all-terrain vehicle with an engine comprising:

a variable-speed drive operatively connected to the engine, and a gear transmission mechanism operatively connected to the variable-speed drive, the gear transmission mechanism including:

a single shifting fork for selecting at least a forward high-speed ratio, a forward low-speed ratio, neutral and reverse, a shifting lever disposed at a position below a right end part or a left end part of a handlebar at a level above the engine, the shifting lever extending substantially upward, a single change lever shaft connected with a shifting fork, the change lever shaft being disposed on the same side as the side on which the shifting lever is disposed with respect to a longitudinal center axis of the all-terrain vehicle, and the change lever shaft extending substantially upward at a rear end part of the engine, and a single connecting member connecting the change lever shaft and the shifting lever, the connecting member extending at a right or left side with respect to the engine, wherein the gear transmission mechanism further comprises a gate member provided with a longitudinal guide slot for guiding the shifting lever, the guide slot being provided in the same side edge of right or left with retaining parts for retaining the shifting lever at a position corresponding to the forward low-speed ratio, the forward high-speed ratio, neutral and reverse, and wherein the shifting lever is supported for turning by a spherical bearing mechanism such that the shifting lever can be tilted forward, rearward, rightward and leftward, the shifting lever being biased by a spring toward the side edge of the guide slot in which the retaining parts are provided.

* * * * *